(12) United States Patent
Zhou et al.

(10) Patent No.: US 11,078,125 B1
(45) Date of Patent: *Aug. 3, 2021

(54) CELLULAR CERAMIC MATERIALS

(71) Applicant: HRL LABORATORIES, LLC, Malibu, CA (US)

(72) Inventors: Chaoyin Zhou, Chino, CA (US); Zak C. Eckel, Mewbury Park, CA (US); Alan J. Jacobsen, Woodland Hills, CA (US); William Carter, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 454 days.

This patent is subject to a terminal disclaimer.

(21) Appl. No.: 15/060,488

(22) Filed: Mar. 3, 2016

Related U.S. Application Data

(60) Provisional application No. 62/128,410, filed on Mar. 4, 2015.

(51) Int. Cl.
*C04B 38/00* (2006.01)
*C04B 38/06* (2006.01)

(52) U.S. Cl.
CPC .......... *C04B 38/0006* (2013.01); *C04B 38/00* (2013.01); *C04B 38/062* (2013.01); *C04B 2235/3895* (2013.01); *C04B 2235/483* (2013.01)

(58) Field of Classification Search
CPC .... C04B 38/062; C04B 38/00; C04B 38/0006
See application file for complete search history.

(56) References Cited

U.S. PATENT DOCUMENTS

| | | | | |
|---|---|---|---|---|
| 3,695,877 A | * | 10/1972 | Taneda et al. | C08F 283/01 430/285.1 |
| 3,790,378 A | * | 2/1974 | Hayakawa | G03F 7/0285 430/292 |
| 4,167,415 A | | 9/1979 | Higuchi et al. | |
| 4,406,826 A | | 9/1983 | Morgan | |
| 4,575,330 A | | 3/1986 | Hull | |

(Continued)

OTHER PUBLICATIONS

Gupta et al., "A Validated UV Spectrophotometric Method for Simultaneous Estimation of Tretinoin and Benzoyl Beroxide in Bulk and Semi Solid Dosage Form", Rasayan J. Chem., vol. 2, No. 3 (2009), p. 649-654.

(Continued)

*Primary Examiner* — Mathieu D Vargot
(74) *Attorney, Agent, or Firm* — Lewis Roca Rothgerber Christie, LLP

(57) ABSTRACT

A cellular material includes a continuous solid phase including an ordered ceramic material, the solid phase having a solid core including the ordered ceramic material. A composition for forming a cellular material includes: a first UV curable pre-ceramic monomer; a second UV curable pre-ceramic monomer; and a photoinitiator. A method of forming at least one ceramic waveguide includes: securing a volume of a composition including a UV curable pre-ceramic monomer; exposing the composition to a light source to form at least one polymer waveguide including a pre-ceramic material; and converting the pre-ceramic material of the polymer waveguide to a ceramic material to form a ceramic waveguide.

15 Claims, 28 Drawing Sheets

(56) References Cited

U.S. PATENT DOCUMENTS

| | | | |
|---|---|---|---|
| 5,132,354 | A | 7/1992 | DeLaet |
| 5,236,967 | A | 8/1993 | Ohkawa |
| 6,008,296 | A | 12/1999 | Yang et al. |
| 6,534,184 | B2 | 3/2003 | Knasiak et al. |
| 6,573,020 | B1 | 6/2003 | Hanemann et al. |
| 7,382,959 | B1 | 6/2008 | Jacobsen |
| 8,017,193 | B1 | 9/2011 | Zhou et al. |
| 8,197,930 | B1 | 6/2012 | Jacobsen |
| 8,320,727 | B1 | 11/2012 | Jacobsen |
| 8,906,593 | B1 * | 12/2014 | Nowak .................. G03F 7/027 430/270.1 |
| 10,196,464 | B1 * | 2/2019 | Zhou ........................ C08F 2/50 |
| 2006/0069176 | A1 * | 3/2006 | Bowman ............... C04B 35/584 522/1 |
| 2008/0194721 | A1 | 8/2008 | Arney et al. |
| 2009/0012202 | A1 | 1/2009 | Jacobine et al. |
| 2010/0029801 | A1 | 2/2010 | Moszner et al. |
| 2010/0269721 | A1 * | 10/2010 | Takahashi ................ B41C 1/05 101/395 |

OTHER PUBLICATIONS

Stevens, Malcolm P., "Polymer Chemistry: An Introduction", Oxford (1999), p. 172.

* cited by examiner

CELLULAR CERAMIC MATERIALS

CROSS-REFERENCE TO RELATED APPLICATION(S)

This application claims priority to and the benefit of related U.S. Provisional Application Ser. No. 62/128,410, filed in the U.S. Patent and Trademark Office on Mar. 4, 2015, the entire content of which is incorporated herein by reference.

STATEMENT REGARDING FEDERALLY SPONSORED RESEARCH OR DEVELOPMENT

This invention was made with U.S. Government support under Contract No. W91CRB-10-C-0305 awarded by US Army RDECOM. The U.S. Government has certain rights to this invention.

BACKGROUND

Polymer cellular materials may be mass produced through various foaming processes, which yield random (not ordered) three dimensional (3D) microstructures. An ordered 3D microstructure is one that is ordered at the micrometer or nanometer scale. While techniques exist to create polymer materials having ordered 3D microstructures, such as stereolithography techniques, these techniques utilize a bottom-up, layer-by-layer approach that prohibits or reduces scalability (e.g., scalability of production).

Stereolithography provides a method of building a 3D microstructure in a layer-by-layer process. This process generally involves a platform (e.g., substrate) that is lowered into a photo-monomer bath in separate or discrete stages. At each layer, a laser is utilized to scan over the area of the photo monomer that is to be cured (polymerized) for that particular layer. Once the layer is cured, the platform is lowered by a set or specific amount (e.g., an amount guided by the processing parameters and suitable or desired feature/surface resolution), and the process is repeated until the complete 3D structure is created.

Modifications to the above-described stereolithography technique have been developed to improve the resolution by utilizing laser optics and special resin formulations, as well as modifications to decrease the fabrication time of the 3D structure by utilizing a dynamic pattern generator to cure an entire or substantially entire layer concurrently (e.g., simultaneously or all at once). Another advancement to the standard stereolithography technique includes a two-photon polymerization process. However, this modified process still utilizes a complicated and time consuming layer-by-layer approach.

3D ordered polymer cellular structures have also been created utilizing optical interference pattern techniques. Such processes may also be referred to as holographic lithography. Structures made utilizing these techniques have an ordered structure at the nanometer scale, but the structures are limited by the range of interference patterns that are available.

Polymer optical waveguides have also been created. A polymer optical waveguide can be formed utilizing certain photopolymers that undergo a refractive index change during the polymerization process. When a monomer that is photo-sensitive is exposed to light (e.g., UV light) under suitable conditions (e.g., the right conditions), the initial area of polymerization, such as a small circular area, will "trap" the light and guide it to the tip of the polymerized region due to the index of refraction change, thereby further advancing the polymerized region. If the polymer is suitably or sufficiently transparent to the wavelength of light utilized to initiate polymerization, the process will continue, leading to the formation of a waveguide structure, or fiber, having approximately the same cross-sectional dimensions along its entire or substantially entire length. This phenomenon may be suitable for various applications, such as fiber optic interconnects. Techniques for creating polymer optical waveguides allow for one or a few waveguides to be formed.

SUMMARY

According to embodiments of the present disclosure, a cellular material includes a continuous solid phase including an ordered ceramic material, the solid phase having a solid core including the ordered ceramic material. In some embodiments, the cellular material includes: at least one constituent including a continuous solid phase including an ordered ceramic material, the solid phase having a solid core including the ordered ceramic material.

The solid phase may be ordered to define a hollow honeycomb, solid honeycomb, pyramidal, or truss geometry structure.

In some embodiments, the cellular material includes silicon oxycarbide (SiOC), silicon carbide (SiC), silicon nitride ($Si_3N_4$), silicon oxycarbonitride (SiOCN), silicon oxynitride (SiON), silicon carbonitride (SiCN), silicon boronitride (SiBN), silicon boron carbonitride (SiBCN), boron nitride (BN), boron carbonitride (BCN), aluminum nitride (AlN), or a combination thereof (e.g., a physical and/or chemical combination and/or mixture thereof).

In some embodiments, the cellular material includes a second phase including a vapor and/or a liquid. For example, the vapor and/or liquid may be another constituent of the cellular material.

The solid phase may be at least partially surrounded by a vacuum.

In some embodiments, the solid phase is disordered. For example, the solid phase may have an open-cell foam geometry.

The cellular material may be directly prepared from a pre-ceramic material, and the pre-ceramic material may be prepared from a composition including UV curable pre-ceramic monomers.

According to embodiments of the present disclosure, a composition for forming an ordered ceramic material includes: a first UV curable pre-ceramic monomer including two or more groups selected from the group consisting of C=X double bonds, CX triple bonds, and combinations thereof, X being selected from the group consisting of C, S, N, and O, the first UV curable pre-ceramic monomer including at least one non-carbon atom in a main chain and/or a side chain, and the non-carbon atom being selected from the group consisting of Si, B, Al, Ti, Zn, P, S and Ge; a second UV curable pre-ceramic monomer including two or more groups selected from the group consisting of thiol groups (SH groups), hydroxyl groups (OH groups), amine groups (NH groups), and combinations thereof, the second UV curable pre-ceramic monomer including at least one non-carbon atom in a main chain and/or a side chain selected from the group consisting of Si, B, Al, Ti, Zn, P, S and Ge; and a photoinitiator.

The composition may further include a free radical inhibitor in an amount sufficient to allow formation of pre-ceramic waveguides and to reduce polymerization of the UV curable pre-ceramic monomers in regions outside of the pre-ceramic waveguides.

The free radical may be selected from the group consisting of hydroquinone; methylhydroquinone; ethylhydroquinone; methoxyhydroquinone; ethoxyhydroquinone; monomethylether hydroquinone; propylhydroquinone; propoxyhydroquinone; tert-butylhydroquinone; n-butylhydroquinone, and mixtures thereof.

The first UV curable pre-ceramic monomer may be present in the composition in an amount of 3% to 97% by weight based on the total weight of the composition.

The C=X double bonds or CX triple bonds may be located at respective terminal positions of the first UV curable pre-ceramic monomer.

The second UV curable pre-ceramic monomer may be present in the composition in an amount of greater than 0% to 97% by weight based on the total weight of the composition.

The second UV curable pre-ceramic monomer may include an alkyl group, an ester group, an amine group, and/or a hydroxyl group.

The photoinitiator may be present in the composition in an amount of greater than 0% to less than 10% by weight based on the total weight of the composition.

The photoinitiator may generate free radicals by intramolecular bond cleavage and/or intermolecular hydrogen abstraction when exposed to UV light.

The UV light may have a wavelength of 200 nm to 500 nm.

The photoinitiator may be selected from the group consisting of 2,2-dimethoxy-2-phenyl acetophenone; 2-hydroxy-2-methylpropiophenone; camphorquinone; bis(2,4,6-trimethylbenzoyl)-phenylphosphineoxide; benzophenone; benzoyl peroxide; and mixtures thereof.

The first UV curable pre-ceramic monomer may include at least one additional non-carbon atom selected from the group consisting of O and N.

X may be selected from the group consisting of N and O.

The second UV curable pre-ceramic monomer may include at least one additional non-carbon atom selected from the group consisting of O and N.

According to embodiments of the present disclosure, a method for forming at least one ceramic waveguide includes: securing a volume of a composition including a UV curable pre-ceramic monomer; exposing the composition to a light source to form at least one polymer waveguide including a pre-ceramic material; and converting the pre-ceramic material of the polymer waveguide to a ceramic material to form a ceramic waveguide.

In some embodiments, the exposing the composition includes: securing a mask having at least one aperture between a collimated light source and the volume of the composition; and directing a beam of collimated light from the collimated light source to the mask for a period of exposure time such that a portion of the beam of collimated light passes through the mask and is guided by the at least one aperture into the volume of the composition to form the at least one polymer waveguide through a portion of the volume of the composition.

The method may further include converting the polymer waveguide to a ceramic waveguide.

The converting the polymer waveguide to the ceramic waveguide may include heat treating the polymer waveguide.

BRIEF DESCRIPTION OF THE DRAWING

The patent or application file contains at least one drawing executed in color. Copies of this patent or patent application publication with color drawing(s) will be provided by the Office upon request and payment of the necessary fee. The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
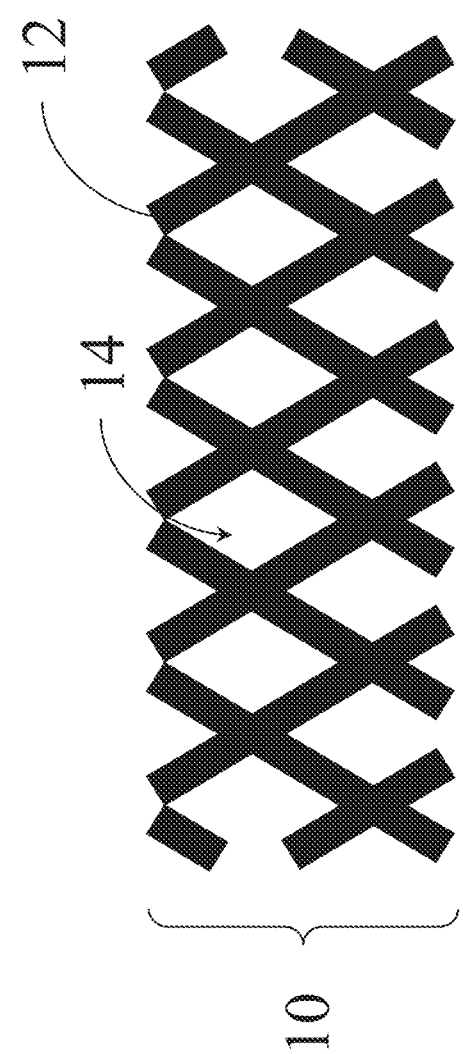
FIG. 1 is a schematic cross-sectional view of an ordered cellular material according to one embodiment of the present disclosure.

In the following detailed description, only certain embodiments of the subject matter of the present disclosure are shown and described, by way of illustration. As those skilled in the art would recognize, the subject matter of the present disclosure may be embodied in many different forms and should not be construed as being limited to the embodiments set forth herein. Also, in the context of the present application, when a first element is referred to as being "on," "coupled to," or "connected to" a second element, it can be directly on, directly coupled to, or directly connected to the second element or be indirectly on, indirectly coupled to, or indirectly connected to the second element with one or more intervening elements interposed therebetween. Like reference numerals designate like elements throughout the specification.

A cellular ceramic material according to embodiments of the present disclosure includes an ordered ceramic material formed directly from a pre-ceramic material. Embodiments of the cellular ceramic material may include a continuous solid phase including the ordered ceramic material. For example, the cellular ceramic material may include at least two constituents (e.g., components) where at least one constituent is the continuous solid phase. The ordered ceramic material may be prepared from a series of pre-ceramic monomer formulations that can be utilized to form an interconnected three-dimensional pattern of self-propagating waveguides and enable the direct conversion to interconnected three-dimensional ceramics. The interconnected three-dimensional ceramic materials include, but are not limited to, silicon oxycarbide (SiOC), silicon carbide (SiC), silicon nitride ($Si_3N_4$), silicon oxynitride (SiON), silicon carbonitride (SiCN), silicon boronitride (SiBN), silicon boron carbonitride (SiBCN), boron nitride (BN), boron carbonitride (BCN), aluminum nitride (AlN), and the like, and mixtures or combinations thereof.

Embodiments of the present disclosure enable direct, near-net-shape conversion of a polymer micro-truss structure formed from an interconnected pattern of self-propagating waveguides to a ceramic micro-truss structure without the need for any additive material. For example, embodiments of the present disclosure allow for the direct conversion of a cellular material including a pre-ceramic material to a cellular material including a ceramic material, where the ceramic material is formed directly from the pre-ceramic material (e.g., without the addition of any other material to the pre-ceramic material). According to embodiments of the disclosure, the monomers and polymeric systems maintain certain or specific properties so that they can form an interconnected pattern of waveguides, which may define three-dimensional open-cellular, micro-truss structures. The direct conversion of the cellular material including the pre-ceramic material (e.g., the polymeric micro-truss structure) to the cellular material including the ceramic material (e.g., a ceramic micro-truss structure) can be achieved by utilizing a simple heat treatment and greatly reduce the time and cost of creating ceramic micro-truss structures in comparison to other techniques. The pre-ceramic monomer formulations (compositions) allow the formation of polymer waveguides and ceramic structures that are low cost, lightweight, and have high thermal shock resistance, low thermal conductivity, high thermal stability, and high mechanical stability. The versatility and the applications of embodiments of these pre-ceramic monomer formulations make the resultant compounds especially valuable.

In some embodiments, the cellular material is directly prepared from a pre-ceramic material by heat treating the pre-ceramic material to directly form the cellular material, and where the pre-ceramic material is formed by polymerization of pre-ceramic monomer (e.g., a plurality of one kind of pre-ceramic monomer or a plurality of pre-ceramic monomers where at least one pre-ceramic monomer is different from the other pre-ceramic monomers).

Embodiments of the present disclosure may be utilized in any of a variety of suitable applications in both the automotive and aerospace industries where the high temperature ceramic micro-truss structures formed from embodiments of the disclosed formulations would be useful. For example, embodiments of the cellular ceramic materials (e.g., ceramic micro-truss materials) may be utilized for lightweight, high temperature structural applications or for other suitable applications that utilize the features of the microstructure, such as the leading edges on supersonic airplanes.

(1) Cellular Ceramic Materials

According to embodiments of the disclosure, a cellular ceramic material may include at least one constituent including a solid phase (e.g., a continuous solid phase) including an ordered ceramic material.

The solid phase may be continuous and may be ordered or periodic to define, for example, a hollow honeycomb, a solid honeycomb, pyramidal, and/or a truss geometry. As used herein, the term "ordered" may refer to a solid phase that repeats periodically in 2- or 3-dimensions (e.g., a solid phase having structural features that repeat periodically in 2- or 3-dimensions). For example, the ordered solid phase may periodically repeat at the micrometer or nanometer scale. The ordered solid phase may include unit cells that repeat in 2- or 3-dimensions. The unit cells may be arranged in a tessellation and may have any suitable shape (e.g., a prismatic shape such as, but not limited to, pentagonal prisms, square prisms, or triangular prisms; and/or a non-prismatic shape such as, but not limited to, a cylinder). In some embodiments, the solid phase is disordered to define an open-cell foam geometry, but the present disclosure is not limited thereto. For example, the solid phase may be disordered to define a closed-cell foam geometry. As used herein, the term "disordered" may refer to a random solid phase (e.g., a solid phase having structural features that are randomly arranged) in 2- or 3-dimensions. A structural feature may be, without limitation, intersecting nodes of optical waveguides, the shape of a solid phase, and/or length, width, and/or height of a solid phase.

Another constituent (e.g., a second constituent) of the cellular ceramic material may be a vapor (e.g., a gas) and/or a liquid. In some embodiments, the cellular ceramic material may have a vacuum partially or completely surrounding the solid phase and/or the second constituent. FIG. 1 is a cross-sectional view showing an embodiment of a cellular ceramic material 10. As shown in FIG. 1, the cellular ceramic material 10 includes a continuous solid phase 12 (e.g., a strut, such as a ceramic material formed directly from a self-propagating optical polymer waveguide of a pre-ceramic material), and a second constituent or void (e.g., a vacuum) 14. The continuous solid phase 12 may define a three-dimensional (3D) structure (e.g., a microlattice structure) of the cellular ceramic material 10.

Figure 2:
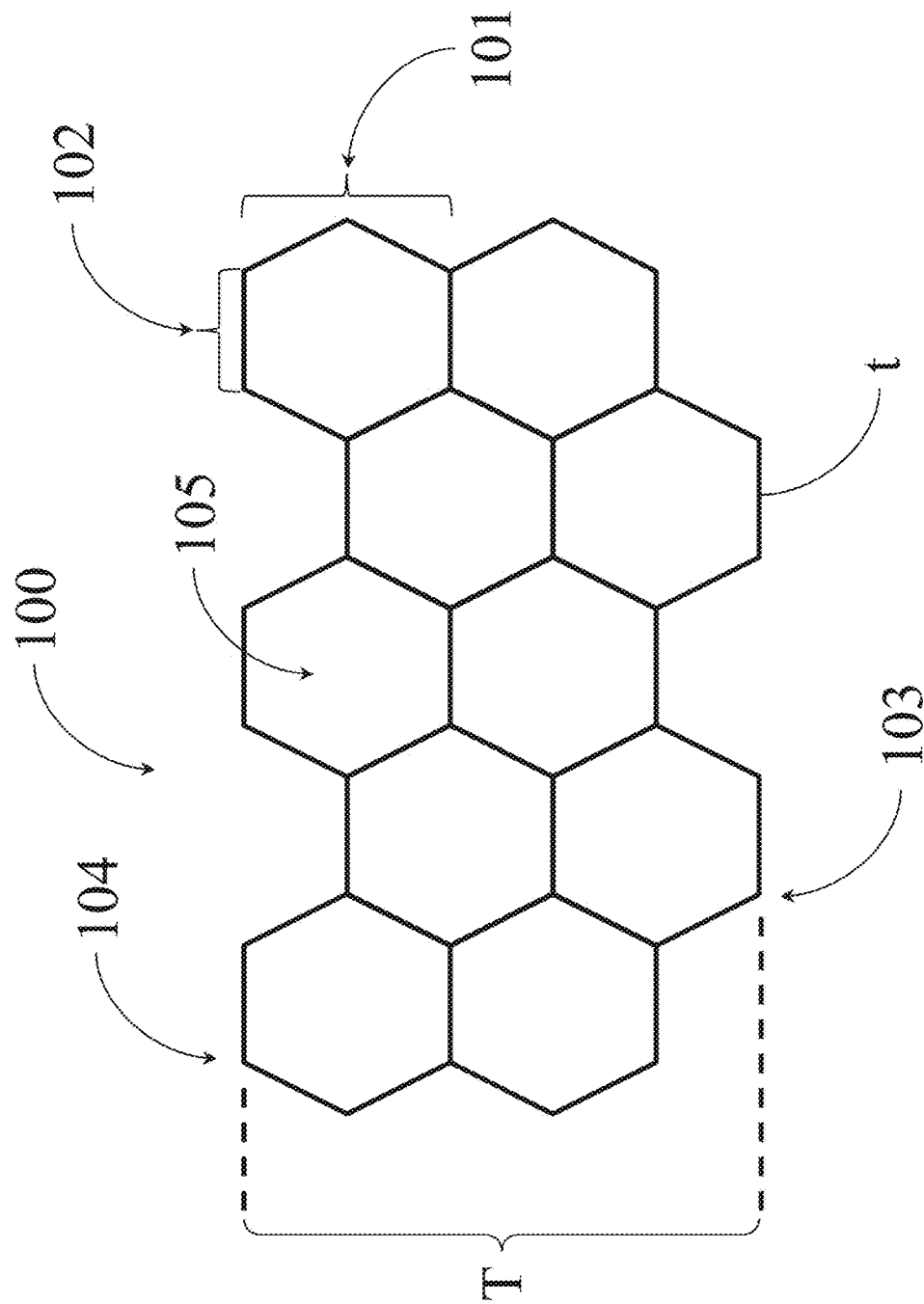
FIG. 2 is a schematic cross-sectional view of an ordered cellular material according to one embodiment of the present disclosure.

With reference now to FIG. 2, an ordered cellular structure 100 according to one embodiment of the present disclosure includes a series of interconnected unit cells 101. In the illustrated embodiment, each unit cell 101 includes a six straight wall segments 102 arranged in a hexagonal shape such that each unit cell 101 is a hexagonal prism. Additionally, in the illustrated embodiment, the hexagonal unit cells 101 are arranged in a tessellation. Accordingly, in the illustrated embodiment, the ordered cellular structure 100 is a honeycomb structure. In one or more embodiments, the unit cells 101 may have any other suitable shape, such as, for instance, any other prismatic shape (e.g., pentagonal prisms, square prisms, or triangular prisms) or a nonprismatic shape (e.g., cylinders). Accordingly, although in the illustrated embodiment each unit cell 101 includes six straight wall segments 102, in one or more embodiments, the unit cells 101 may have any other suitable number of straight wall segments 102, such as, for instance, from one to eight straight wall segments 102, depending on the shape of the unit cells 101. Additionally, although in the illustrated embodiment each unit cell 101 has the same shape, in one or more alternate embodiments, two or more of the unit cells 101 may have different shapes.

Additionally, although in the illustrated embodiment the ordered cellular structure 100 is uniform (e.g., each unit cell 101 has the same size and shape), in one or more alternate embodiments the ordered cellular structure 100 may be spatially tailored or graded depending on the intended application of the ordered cellular structure 100. For instance, the shape and/or size of the unit cells 101 may vary across the ordered cellular structure 100 depending on the spatial distribution of the mechanical loads the ordered cellular structure 100 is designed to bear. In one or more embodiments, the unit cells 101 may not be arranged in a tessellation (e.g., the unit cells 101 may be arranged in an irregular pattern). Additionally, in one or more embodiments, a wall thickness t of the straight wall segments 102 may vary across the ordered cellular structure 100. In one or more embodiments, the wall thickness t of the straight wall segments 102 may be approximately 4 mm or less. Moreover, although in the illustrated embodiment the ordered cellular structure 100 has a constant or uniform thickness T measured from a lower end 103 of the ordered cellular structure 100 to an upper end 104 of the ordered cellular structure 100, in one or more embodiments, the thickness T may vary across the ordered cellular structure 100.

In the illustrated embodiment, the straight wall segments 102 of each unit cell 101 are arranged in a closed loop such that each unit cell 101 is a closed cell (e.g., the straight wall segments 102 of each unit cell 101 are arranged and interconnected to form a continuous structure). For instance, in the illustrated embodiment, the straight wall segments 102 of each unit cell 101 define a cavity 105 and each cavity 105 is isolated or separated by the straight wall segments 102 from the cavities 105 defined by the other unit cells 101. In one or more alternate embodiments, the ordered cellular structure 100 may be an open cellular structure. For instance, in one or more embodiments, the cavities 105 defined by the unit cells 101 may be in fluid communication with each other by apertures (e.g., holes or slots) in one or more of the straight wall segments 102 of the unit cells 101.

Additionally, although in the illustrated embodiment the ordered cellular structure 100 is planar or substantially planar, in one or more alternate embodiments, the ordered cellular structure 100 may be non-planar (e.g., curved). For instance, in one or more embodiments, at least a portion of the ordered cellular structure 100 may be conical or tubular. In one or more embodiments, at least a portion of the ordered cellular structure 100 has a radius of curvature from approximately 3 times the thickness T of the ordered cellular structure 100 to approximately 100 times the thickness T of the ordered cellular structure 100.

(2) Solid Phase of Cellular Ceramic Materials

According to embodiments of the disclosure, the solid phase of the cellular ceramic material is prepared directly from cellular pre-ceramic materials, which are prepared from pre-ceramic monomer formulations (compositions). As used herein, the term "monomer" may refer to a starting material that may include oligomers and/or polymers that may be reacted by way of a further polymerization reaction. Embodiments of the pre-ceramic monomer formulations, which produce self-propagating pre-ceramic polymer waveguides by photopolymerization, may include: (a) A first molecule comprising two or more unsaturated C=X double bonds or CX triple bonds (e.g., a first UV curable pre-ceramic monomer comprising two or more groups selected from the group consisting of C=X double bonds, CX triple bonds, and combinations thereof, X being selected from the group consisting of C, S, N, and O); (b) A second component (a second molecule) having a structure of R—Y—$H_x$ (e.g., a second UV curable pre-ceramic monomer comprising two or more groups selected from the group consisting of thiol groups, hydroxyl groups, amine groups, and combinations thereof), where Y=O, S, or N, x is 1 or 2 (e.g., R—Y—$H_x$ may have a structure of R—$NH_2$), R is any suitable organic group, inorganic group, or combination thereof, and the molecules R—Y—H can contain two or more $YH_x$ groups (e.g., —OH, —SH, and/or $NH_2$ groups) in the structure that can be utilized in the polymerization reaction; and (c) A photoinitiator, which generates free radicals under a light exposure by one of intramolecular bond cleavage and/or intermolecular hydrogen abstraction from a light having a wavelength from about 200 nm to about 500 nm. By combining suitable pre-ceramic monomers such as, for example, a silazane and/or a silane with vinyl, acrylate, methacrylate, and/or thiol functionalities, polymerization can be triggered by UV light, for example when a photoinitiator is added. Embodiments of the pre-ceramic monomer formulations may also include a free radical inhibitor. The free radical inhibitor may be added in a sufficient amount to the monomer formulation to inhibit or reduce unwanted polymerization in regions outside an optical waveguide so as to allow formation of pre-ceramic waveguides.

Figure 3:
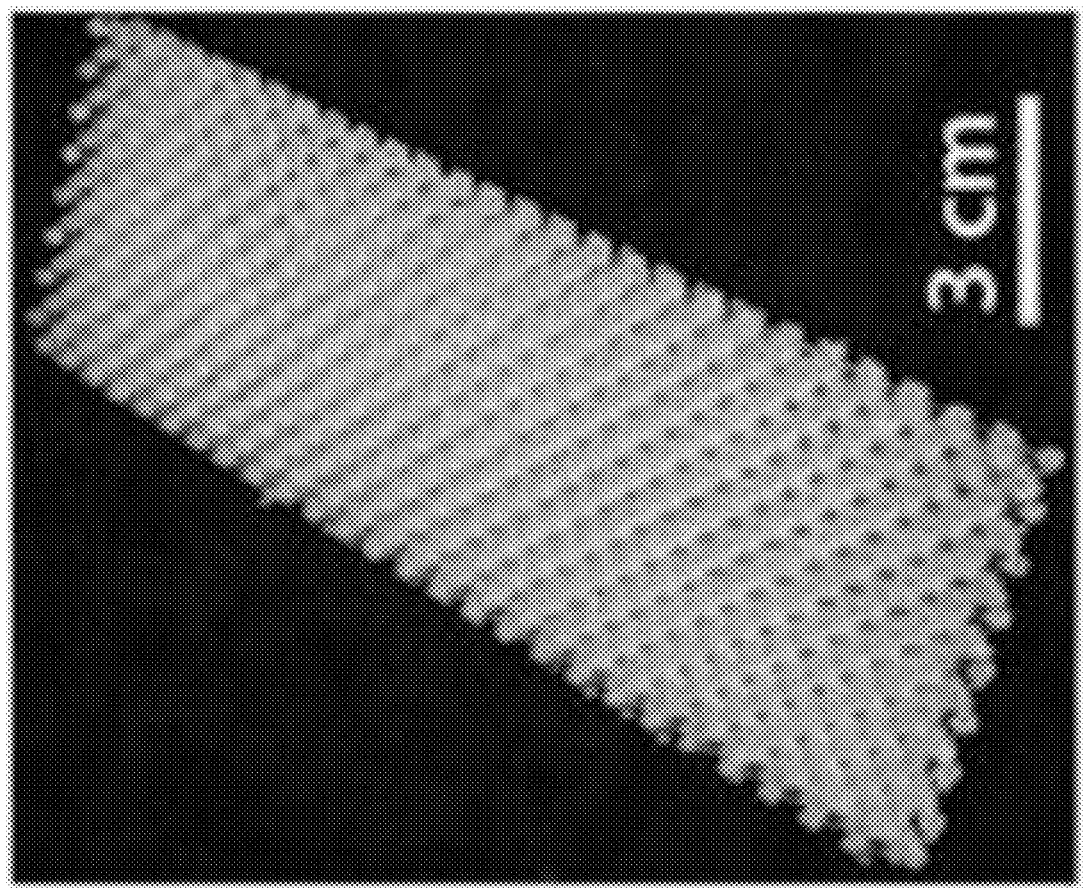
FIG. 3 is a photograph of an ordered cellular material according to an embodiment of the disclosure.

The formation of cellular materials and/or complex structures may be carried out utilizing spatial control of the polymerization reaction. The first component (the first UV curable pre-ceramic monomer) and the second component (the second UV curable pre-ceramic monomer) may be selected such that they undergo a change in the index of refraction upon polymerization, which causes internal reflection of UV light, thereby trapping and/or guiding the UV light in the already formed polymer. Trapping and/or guiding the UV light in the already formed polymer provides a self-focusing effect that forms a polymer waveguide, tunneling the light towards the tip of the waveguide and causing it to polymerize further. The architecture of the material or structure formed in this way may be defined by a patterned mask that defines the areas exposed to a collimated UV light source. By exposing an array of apertures (e.g., circular apertures) with a plurality of (e.g., four) light sources with an equal or substantially equal incident angle and rotated 90° about the mask normal, intersecting waveguides may be formed that create a lattice. FIG. 3 is a photograph of an embodiment of a "green" pre-ceramic polymer lattice. Un-polymerized resin that was not polymerized during the exposure of the composition to collimated UV light may then be drained, stored, and/or reused.

(a) Embodiments of the first molecule including two or more unsaturated C=X double bonds or CX triple bonds (e.g., the first UV curable pre-ceramic monomer), X can be C, S, O, and N. For example, the first molecule may include functional groups such as a C=C double bond (e.g., a C=C group), a CC triple bond (e.g., a CC group), a C=S double bond (e.g., a C=S group), and/or a C≡N triple bond (e.g., a C≡N group). Substitution on the unsaturated bonds may include any suitable atoms such as H, F, and/or Cl, and/or groups such as alkyl groups, esters, amine groups, hydroxyl groups, and/or CN. For example, the foregoing unsaturated bonds (e.g., the C=C group, the C≡C group, the C=S group, and/or the C≡N group) may be bonded to as H, F, and/or Cl, and/or groups such as alkyl groups, esters, amine groups, hydroxyl groups, and/or CN. The first molecule can include any suitable combination of the different unsaturated bonds. Of these different unsaturated bonds, certain embodiments of the first molecule may include the C=C double bonds at respective terminal positions of the first molecule (e.g., three substitutions or positions on the C=C bonds are hydrogen atoms).

Examples of the foregoing groups include ones selected from the group consisting of vinyl, ethynyl, vinyl ether, vinyl ester, vinyl amides, vinyl triazine, vinyl isocyanurate, acrylate, methacrylate, diene, triene, and mixtures thereof. The first molecule is between 3% to about 97% by weight of the monomer formulation. For example, the first UV curable pre-ceramic monomer may be present in the composition in an amount of 3% to 97% by weight based on the total weight of the composition.

The first molecule (the first UV curable pre-ceramic monomer) also contains at least one non-carbon atom in a main chain and/or a side chain thereof. Examples of non-carbon atoms that can be utilized include, but are not limited to, Si, B, Al, Ti, Zn, O, N, P, S, and Ge. The at least one non-carbon atom can be a part of cyclic or acyclic groups or structures of the first UV curable pre-ceramic monomer.

According to embodiments of the disclosure, the first component molecules (the first UV curable pre-ceramic monomer) may include a siloxane, a silazane, and/or a silane. Examples of the first component molecules (the first UV curable pre-ceramic monomer) include, but are not limited to, trivinylborazine; 2,4,6-trimethyl-2,4,6-trivinyl-cyclotrisilazane; 1,3,5,7-tetravinyl-1,3,5,7-tetramethylcyclotetrasilazane; 1,3,5-trivinyl-1,3,5-trimethylcyclosiloxane; 1,3,5,7-tetravinyl-1,3,5,7-tetramethylcyclotetrasiloxane; 2,2,4,4,6,6-hexakisallyloxyl-triazatriphosphinine; tetraallyloxysilane; vinyl terminated polydimethylsiloxane; tetravinylsilane; vinyl terminated polydimethylsiloxane-ethylene copolymer; divinyldimethylsilane; 1,2-divinyltetramethyldisilane; 1,4-bis(vinyldimethylsilyl)benzene; vinylmethylsiloxane homopolymer; methacryloxypropyl terminated polydimethylsiloxane; boron vinyldimethylsiloxide; vinylmethylsiloxane-dimethylsiloxane copolymer, trimethylsiloxy terminated polytrimethylsiloxane-ethylene copolymer; vinylethoxysiloxane-propylethoxysiloxane copolymer; vinyltrimethoxysilane; trivinylmethylsilane; diallyldimethylsilane; 1,3,5-trisilacyclohexane; B,B'B''-triethynyl-N,N'N''-trimethylborazine; and/or B,B'B''-triethynylborazine.

(b) Embodiments of the second component (the second UV curable pre-ceramic monomer) may have a structure of R—Y—$H_x$, where Y=O, S, or N, x is 1 or 2 (e.g., R—Y—$H_x$ may have a structure of R—$NH_2$), R is any suitable organic group, inorganic group, or combination thereof, and the molecules R—Y—H can contain two or more $YH_x$ groups (e.g., two or more —OH, —SH, and/or $NH_2$ groups); and the molecules R—Y—H can contain two or more YH groups (or two or more R—$NH_2$ groups) in the structure that can be utilized in the polymerization. For example, embodiments of the second component may include molecules including two or more SH groups (e.g., thiol or mercapto groups). The R groups may include any suitable organic group such as, for example, an alkyl group, an ester, and amine, and/or a hydroxyl group, and/or the R groups may include any suitable inorganic non-carbon containing atoms or groups. Examples of inorganic non-carbon atoms or groups in the main chain of the second component include, but are not limited to, Si, B, Al, Ti, Zn, P, Ge, S, O, and/or N. The non-carbon atoms may be a part of cyclic or acyclic structures of the second component. The reaction rate of embodiment methods varies depending on the different molecules utilized.

The second molecule is between 0% to about 97% by weight of the monomer formulation. For example, the second UV curable pre-ceramic monomer may be present in the composition in an amount of greater than 0% to 97% by weight based on the total weight of the composition. Examples of the second component include, but are not limited to, pentaerythritol tetrakis(3-mercaptopropionate); trimethylolpropanetris(2-mercaptoacetate); trimethylolpropane tris(3-mercaptopropionate); tetrakis(dimethyl-3-mercaptopropylsiloxy)silane; tetrakis(dimethyl-2-mercaptoacetate siloxy)silane; (mercaptopropyl)methylsiloxane-dimethylsiloxane copolymer; (mercaptopropyl)methylsiloxane homopolymer; and pentaerythritol tetrakis(2-mercaptoacetate).

The first UV curable pre-ceramic monomer and/or the second UV curable pre-ceramic monomer may each include at least one repeating unit selected from Formulae 1 to 3.

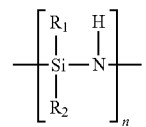

Formula 1

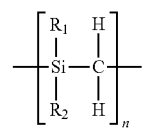

Formula 2

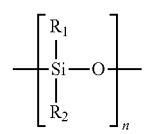

Formula 3

In Formulae 1 to 3, $R_1$ and $R_2$ may each independently be selected from any suitable organic group such as, for example, an alkyl group (e.g., a $C_1$ to $C_8$ alkyl group, such as, for example, a methyl group or an ethyl group). In some embodiments, n is in a range of 1 to 1,000.

(c) Embodiments of the photoinitiator may, when exposed to UV light, generate free radicals by one of intramolecular bond cleavage and/or intermolecular hydrogen abstraction. The UV light may have a wavelength of about 200 nm to about 500 nm. The photoinitiator may be more than 0% to about less than 10% total weight of the monomer formulation. For example, the photoinitiator may be present in the composition in an amount of greater than 0% to less than 10% by weight based on the total weight of the composition. One or a combination of different types of photoinitiators can be utilized in the polymerization process, which may result in different reaction rates.

Examples of suitable photoinitiators include, but are not limited to, 2,2-dimethoxy-2-phenyl acetophenone; 2-hydroxy-2-methylpropiophenone; camphorquinone; bis(2,4,6-trimethylbenzoyl)-phenylphosphineoxide; benzophenone; benzoyl peroxide; and mixtures thereof.

(d) Embodiments of the free radical inhibitor may be added in a sufficient amount to the monomer formulation to inhibit unwanted polymerization of regions outside an optical waveguide so as to allow formation of pre-ceramic waveguides (e.g., waveguides including the pre-ceramic material formed by polymerization of the pre-ceramic monomer and that can be directly converted to a ceramic material). For example the free radical inhibitor may be present in the composition in an amount sufficient to allow formation of pre-ceramic waveguides and to reduce polymerization of the UV curable pre-ceramic monomers in regions outside of the pre-ceramic waveguides. When the free radical inhibitor is not included in the composition, polymerization of the unexposed regions outside the waveguide (e.g., regions that are not directly exposed to the UV light) may occur from residual heat generated from the polymerization reaction or from light that "leaks out" of the waveguide during light exposure. As described herein, the pre-ceramic waveguides are waveguides that are formed by polymerization of the pre-ceramic monomer (or pre-ceramic monomers). The pre-ceramic waveguides include a pre-ceramic material formed by the polymerization of the pre-ceramic monomer (or pre-ceramic monomers). The pre-ceramic waveguides may be directly converted to a ceramic material. For example, the pre-ceramic waveguides (or the pre-ceramic material of the pre-ceramic waveguides) may be directly converted to a ceramic material by heat treatment as described herein.

Examples of the free radical inhibitor include, but are not limited to, hydroquinone; methyl hydroquinone; ethyl hydroquinone; methoxyhydroquinone; ethoxyhydroquinone; monomethylether hydroquinone; propylhydroquinone; propoxyhydroquinone; tert-butylhydroquinone; and/or n-butylhydroquinone. The free radical inhibitor may be suitably selected to be from about 0 to about 1% by weight of the total monomer formulation. For example, the free radical inhibitor may be present in the composition in an amount of about 0% (or greater than 0%) to about 1% by weight based on the total weight of the composition.

According to embodiments of the disclosure, the formation of a pre-ceramic waveguide may result from an index of refraction change between the liquid monomer and the solid pre-ceramic polymer. To allow self-propagation of the pre-ceramic waveguide, the pre-ceramic polymers described herein are transparent (e.g., substantially transparent) to the wavelength(s) of the light that are utilized to generate free radicals and induce polymerization. In some embodiments, the polymerization of the waveguides to form a three dimensional open-cellular pre-ceramic structure occurs in connection with a reactivity such that the reaction (the polymerization) stops when the light exposure is off to avoid or reduce over-curing of the monomer that surrounds the polymer waveguide.

Processes according to embodiments of the present disclosure include polymerizing the first UV curable monomer and the second UV curable monomer to form a partially cured pre-ceramic polymer structure (a "green structure"). After formation of the partially cured pre-ceramic polymer structure, the "green" structure including a partially cured pre-ceramic polymer is relatively flexible and may be shaped utilizing relatively little force (e.g., without utilizing a high-temperature mandrel and/or without machining), for example, to a complex curvature (e.g., a set shape). The complex curvature (e.g., set shape) can then be "locked" through a rapid UV post-cure cycle, which is possible because the partially cured pre-ceramic polymer is not fully crosslinked after the initial UV exposure, if exposure times are selected accordingly. Additional UV exposure (e.g., further curing) increases the level of crosslinking of the partially cured pre-ceramic polymer and cures the pre-ceramic polymer, thereby further increasing its rigidity. Once the pre-ceramic polymer structure is post-cured into shape (e.g., into the set shape), it may be heat treated (e.g., fired at temperature) to form a curved ceramic structure (e.g., a ceramic structure having the set shape) without a high-temperature mandrel and without complex and expensive machining steps.

Figure 4:
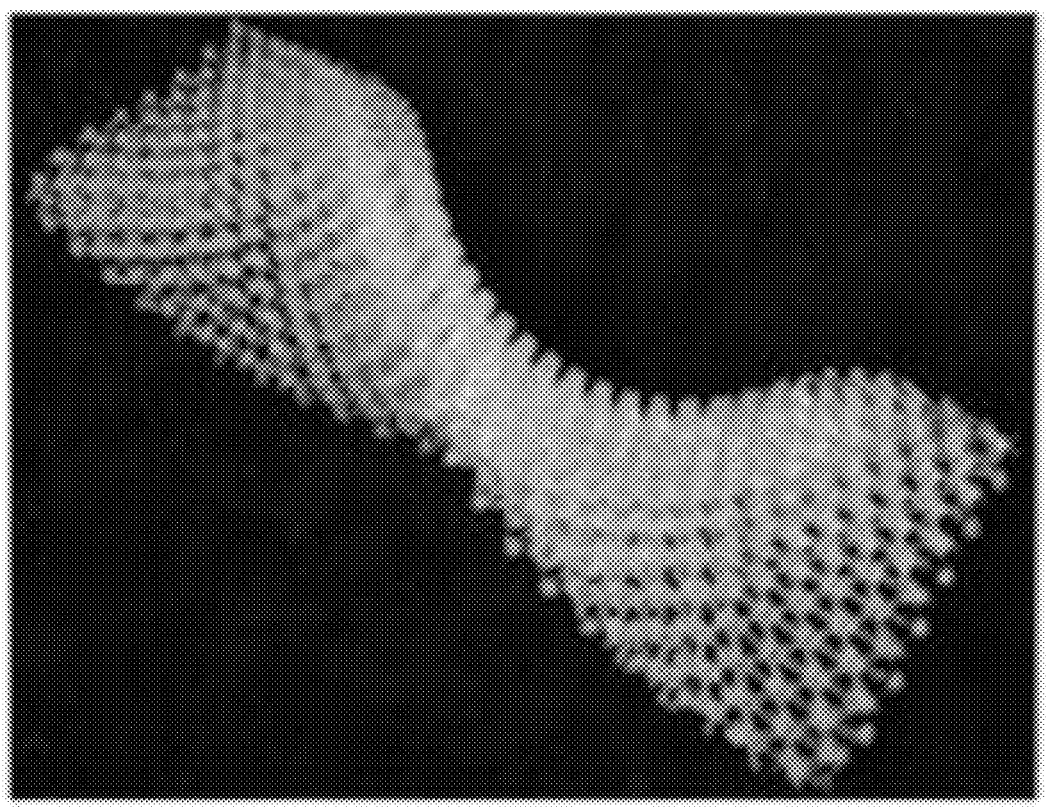
FIG. 4 is a photograph of an ordered cellular material having a set shape according to an embodiment of the present disclosure.
Figure 5:
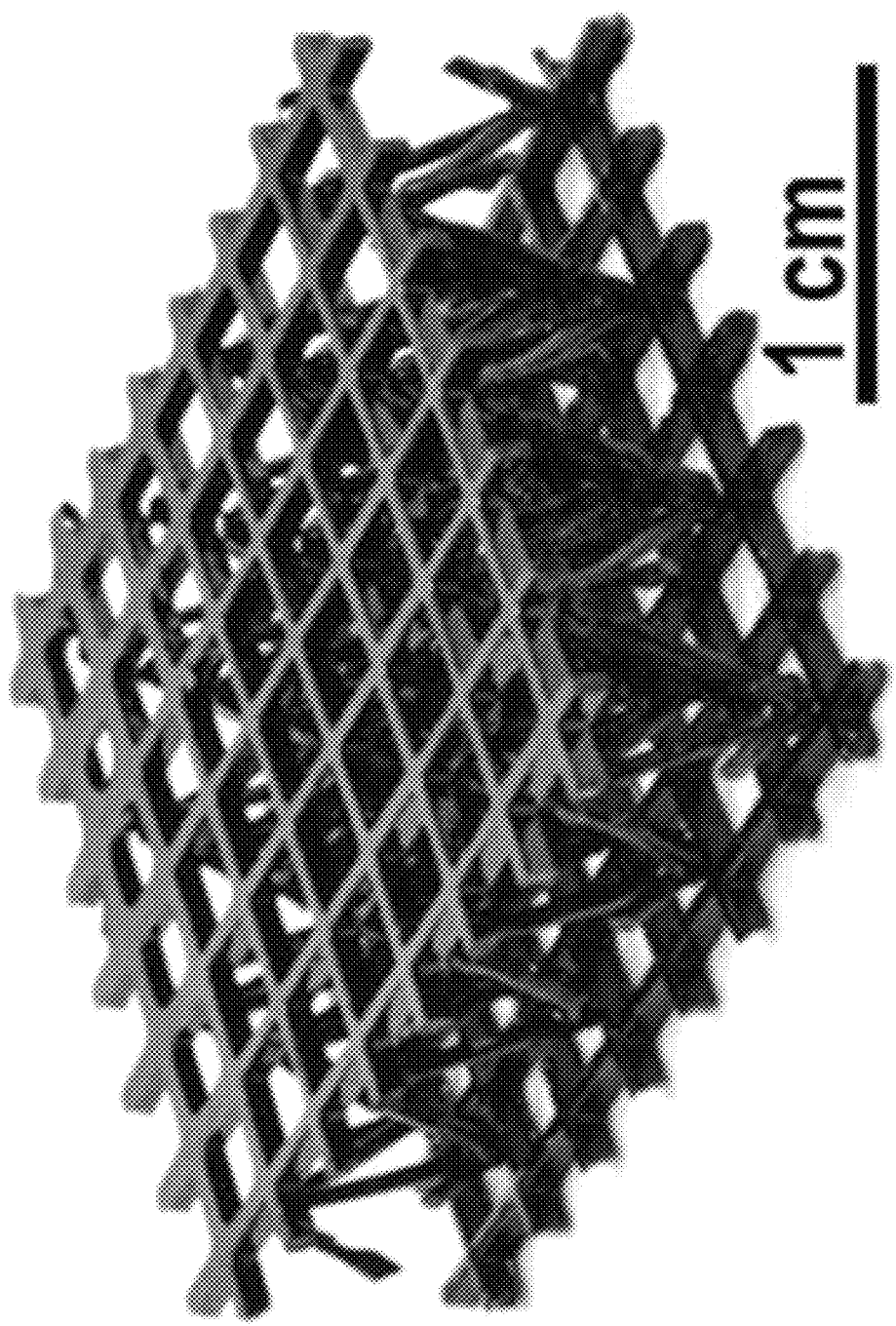
FIG. 5 is a photograph of an ordered cellular material according to an embodiment of the disclosure.
Figure 6:
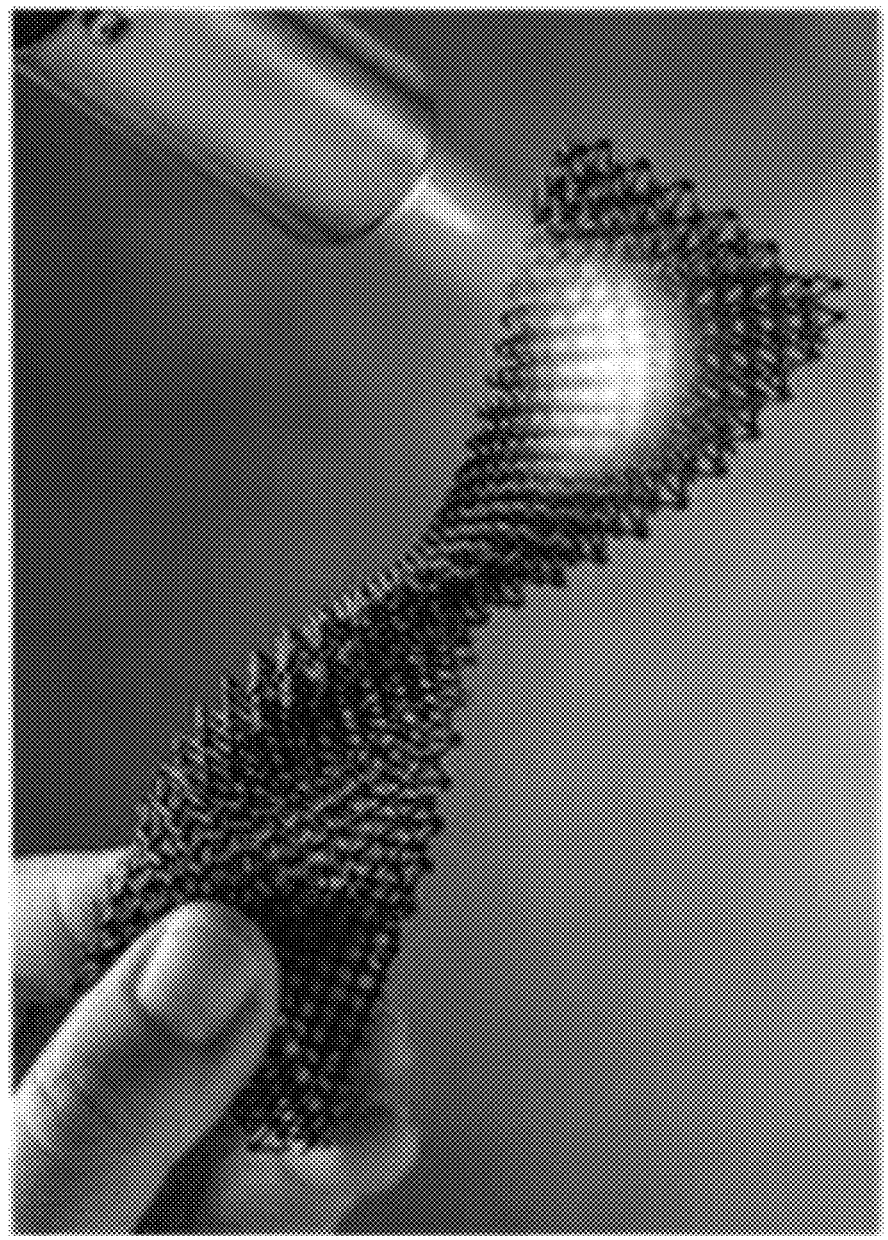
FIG. 6 is a photograph of an embodiment of a cellular ceramic material being exposed to high heat.

FIG. 4 is a photograph of an embodiment of a shaped pre-ceramic polymer lattice (e.g., a "green" pre-ceramic polymer lattice that has been formed into a set shape and locked into the set shape by further curing to form a shaped pre-ceramic lattice having the set shape). Separate and/or different partially cured pre-ceramic polymer structures may be joined together utilizing small amounts of UV curable resin and the resultant joints may be hardened utilizing UV exposure. Upon heat treating (e.g., pyrolysis) a continuous or substantially continuous ceramic material is formed. For example, FIG. 5 is a photograph of an embodiment of a cellular ceramic material having a pyramidal structure. FIG. 6 is a photograph of an embodiment of a cellular ceramic material being exposed to high heat and demonstrating the high thermal shock resistivity and low thermal conductivity of embodiments of the present disclosure (estimated to be close to 1.3 W/m*K, the value of structurally and chemically related amorphous $SiO_2$).

The properties of the pre-ceramic polymer formed from the first UV curable pre-ceramic monomer and the second UV curable may determine the composition, microstructure, and yield of the ceramic material after pyrolysis of the pre-ceramic polymer. A high cross link density of the pre-ceramic polymer may be utilized to prevent or reduce the loss of low molecular weight species and fragmentation of the pre-ceramic polymer during pyrolysis. Siloxane based polymers, which have a Si—O—Si backbone, result in silicon oxycarbides having a relatively high oxygen content, whereas silazanes introduce nitrogen due to the presence of a Si—N—Si backbone (e.g., a Si—NH—Si backbone) in the silazane. Combining siloxanes with silazanes in the pre-ceramic polymer results in a SiOCN ceramic material after pyrolysis. The addition of silane compounds reduce the amount of oxygen available and push the ceramic composition towards SiC. The amount of carbon (or ration of carbon to other elements) in the final ceramic material may be tailored by varying the starting carbon stoichiometry, for example, by including phenyl groups in a side chain of the pre-ceramic polymer or utilizing a carbon based crosslinking agent such as di-vinyl benzene. The precursor chemistry may also be changed to incorporate other elements (e.g., B, Al, Zr) to tailor properties of the pre-ceramic polymer and/or the ceramic material. A wide variety of suitable compositions may be synthesized utilized according to the processes disclosed herein. In some embodiments, a pre-ceramic resin formulation yields a ceramic material including a SiOC ceramic network including a small quantity of sulfur present.

Pre-ceramic materials and cellular ceramic materials may be fabricated from the monomer mixtures described herein as follows. Methods of forming the pre-ceramic materials and cellular ceramic materials, however, are not limited to thereto. An embodiment of a method of forming at least one waveguide may include: (a) forming or securing a volume of a pre-ceramic monomer composition (e.g., a pre-ceramic monomer formulation); (b) securing a mask having at least one aperture between a collimated light source and the volume of the pre-ceramic monomer composition; and (c) directing a collimated light beam from the collimated light source to the mask for a period of exposure time so that a portion of the collimated beam passes through the mask and is guided by the at least one aperture into the volume of the pre-ceramic monomer composition to form at least one waveguide through a portion of the volume of the pre-ceramic monomer composition.

For example, cellular ceramic materials may be prepared by the direct, near net shaped conversion of a pre-ceramic structure (e.g., a pre-ceramic micro-truss structure) including (or formed from) polymer waveguides (e.g., an interconnected pattern of self-propagating pre-ceramic waveguides) to a ceramic structure (e.g., a ceramic micro-truss structure) achieved by heat treating (e.g., pyrolyzing) the polymer waveguides. The heat treating (e.g., pyrolyzing) may be performed for an extended period of time (e.g., 1 to 410 hours) under various suitable atmospheres, which include, but are not limited to, an atmosphere including or consisting of $N_2$, argon (Ar), air, $CH_4$, $C_2H_6$, $C_2H_4$, or a mixture or combination thereof. In some embodiments, the heat treating (e.g., pyrolysis) process produces the cellular ceramic materials (e.g., ceramic micro-truss structures) which may include, but are not limited to, SiC, SiOC, SiOCN, $Si_3N_4$, SiON, SiCN, SiBN, SiBCN, BN, BCN, AlN, and the like, or a mixture or combination thereof. During the heat treating (e.g., pyrolysis), volatile species (e.g., $CH_4$, $H_2$, $CO_2$, $H_2O$, and/or other hydrocarbons) may be evolved from the pre-ceramic material.

The heat treating (e.g., pyrolysis) of the polymer waveguides may include heating the polymer waveguides at a rate of 0.1 to 20° C./minute from ambient temperature (e.g., room temperature or about 25° C.) to a first upper temperature of 1,000° C. (e.g., the polymer waveguides may be heat-treated at a temperature of 1,000° C.), a dwell at the first upper temperature of 1 to 5 hours (e.g., the heating temperature is held at the first upper temperature for a time period of 1 to 5 hours), and cooling to ambient temperature (e.g., room temperature or about 25° C.) at a rate of 0.1 to 20° C./minute. In some embodiments, the heat treating (e.g., pyrolysis) of the polymer waveguides includes heat treating the polymer waveguides at the first upper temperature of 1,000° C. for a suitable dwell time, and then subsequently heating the polymer waveguides at a rate of 0.1 to 20° C./minute to a second upper temperature of 2,400° C. (e.g., the polymer waveguides may be heat-treated at a temperature of 2,400° C.), followed by a dwell at the second upper temperature of 1 to 5 hours (e.g., the heating temperature is held at the second upper temperature for a time period of 1 to 5 hours), and cooling to ambient temperature (e.g., room temperature or about 25° C.) at a rate of 0.1 to 20° C./minute. The foregoing heating temperatures may be varied to any suitable temperature in the foregoing ranges. According to embodiments of the present disclosure, the heat treating (e.g., pyrolysis) described herein directly converts the pre-ceramic materials to ceramic materials (e.g., SiC, SiOC, $Si_3N_4$, SiOCN, SiON, SiCN, SiBN, SiBCN, BN, BCN AlN, and the like or a mixture or combination thereof) without the introduction of any additional materials or reactants into the system and produces ceramic materials having no or substantially no porosity and/or defects.

For example, the cellular ceramic materials according to embodiments of the present disclosure can be prepared without the addition of sintering additives, which improves the thermo-mechanical properties of the resultant cellular ceramic materials. Silicon oxycarbide microlattice and honeycomb materials fabricated according to embodiments of the present disclosure exhibit strengths of 9 to 163 megapascals (MPa) at densities of 0.05 to 0.8 $g/cm^3$, which is 10 times higher than that of ceramic foams of similar density produced according to different methods. The silicon oxycarbide microlattice and honeycomb materials fabricated according to embodiments of the present disclosure exhibit good oxidation performance and survive 3 hours at 1700° C. in air with less than 1 $mg/cm^2$ weight loss. Embodiments of the present disclosure should be suitable for thermal protection systems, porous burners, biomedical devices, and lightweight, load bearing sandwich structures.

Embodiments of the present disclosure will now be described with reference to the following examples. The examples, however, are only for purposes of illustration, and the present disclosure is not limited thereto. The glassware utilized in the following examples was thoroughly cleaned in de-ionized water, rinsed in acetone, dried in a chemical free oven (an oven that is substantially free of contaminants) at 100° C. for at least two hours, and stored in a dessicator prior to being utilized.

Preparation Example 1

A monomer system including 100 parts of a (mercaptopropyl)methylsiloxane-dimethylsiloxane copolymer, 500 parts of 1,3,5,7-tetravinyl-1,3,5,7-tetramethylcyclotetrasiloxane, and 0.3 parts of 2,2-dimethyl-2-phenylacetophenone, where all parts are by weight, was thoroughly stirred or blended to make sure that the components were well mixed and the solution was a uniform or substantially uniform system. The system provides a mixture (e.g., a mixture of 200 grams) that may be readily utilized after being mixed at room temperature (e.g., 25° C.). For prolonged storage, the mixture may be stored in a refrigerator having a temperature around 5° C. or less to reduce or inhibit free radical production.

Preparation Example 2

A monomer mixture including 100 parts of 1,3,5-trivinyl-1,3,5-trimethylcyclotrisilazane, 100 parts of a (mercaptopropyl)methylsiloxane polymer, and 0.1 parts of 2,2-dimethyl-2-phenylacetophenone, where all parts are by weight, was thoroughly stirred or blended to make sure that the components were well mixed and the mixture was a uniform or substantially uniform system. The system provides a material mixture that may then readily be utilized for the fabrication of cellular materials (e.g., three-dimensional interconnected pre-ceramic micro-truss structures).

Preparation Example 3

A monomer mixture including 100 parts of a vinylmethoxysiloxane polymer, 100 parts of a (mercaptopropyl) methylsiloxane polymer, and 0.1 parts of 2,2-dimethyl-2-phenylacetophenone, where all parts are by weight, was thoroughly stirred or blended to make sure that the components were well mixed and the mixture was a uniform or substantially uniform system. The system provides a material mixture that may then readily be utilized for the fabrication of cellular materials (e.g., three-dimensional interconnected pre-ceramic micro-truss structures).

Preparation Example 4

A monomer mixture including 100 parts of a (mercaptopropyl)methylsiloxane-dimethylsiloxane copolymer, 100 parts of a vinylmethoxysiloxane polymer, and 0.1 parts of 2,2-dimethyl-2-phenylacetophenone, where all parts are by weight, was thoroughly stirred or blended to make sure that the components were well mixed and the solution was a uniform or substantially uniform system. The system provides a material mixture that may then readily be utilized for the fabrication of three-dimensional interconnected pre-ceramic micro-truss structures.

EXAMPLES (Pre-Ceramic Polymer Microlattice, Honeycomb, and Pyramidal Formation)

UV curable siloxane formulations as described herein were respectively mixed with a photoinitiator (a UV free radical photoinitiator) as described herein and were utilized to form pre-ceramic microstructures. For example, 150 grams of (mercaptopropyl)methylsiloxane homopolymer and 150 grams of vinylmethoxysiloxane were mixed with 75 mg of bis(2,4,6-trimethylbenzoyl)-phenylphosphineoxide, and the resultant liquid resin was poured into a DELRIN® reservoir (DELRIN® is a registered trademark of DuPont). The resin reservoir was covered with a mylar photomask attached to a 3.2 mm thick square glass plate. To form microlattices A-E and L-O of Table 1 below, the photomask had substantially circular apertures patterned over a 23 cm×23 cm area, which were exposed with collimated UV light at 7.5 mW/cm² at the mask surface generated from a 2000W mercury arc lamp (available from Bachur & Associates, Santa Clara, Calif.) utilizing substantially equal incident angle off the mask surface and rotated 90° about the mask normal. The exposure times varied between 1 min to 2.5 min depending on the thickness and architecture of the microlattice. To form honeycomb structures I-K of Table 1 below, a photomask having a honeycomb pattern was exposed with one collimated UV lamp from above. To form pyramidal structures G and H of Table 1 below, a photomask having apertures suitable for forming a pyramidal structure was utilized. After exposure to UV light, each polymer structure was extracted from the reservoir, drained of uncured resin and blown with hot air to remove additional uncured resin. In certain cases, the "green" polymer structure (e.g., the partially cured pre-ceramic polymer structure) was then formed into a set shape (e.g., a desired shape) and exposed to additional UV light at ~7.5 mW/cm² to further cure the polymer in order to maintain the set shape. A final UV post cure was performed at 125 mW/cm² for 2 minutes to fully cure the polymer (to form a cured pre-ceramic polymer structure).

(Ceramic Formation Through Pyrolysis)

Figure 7:
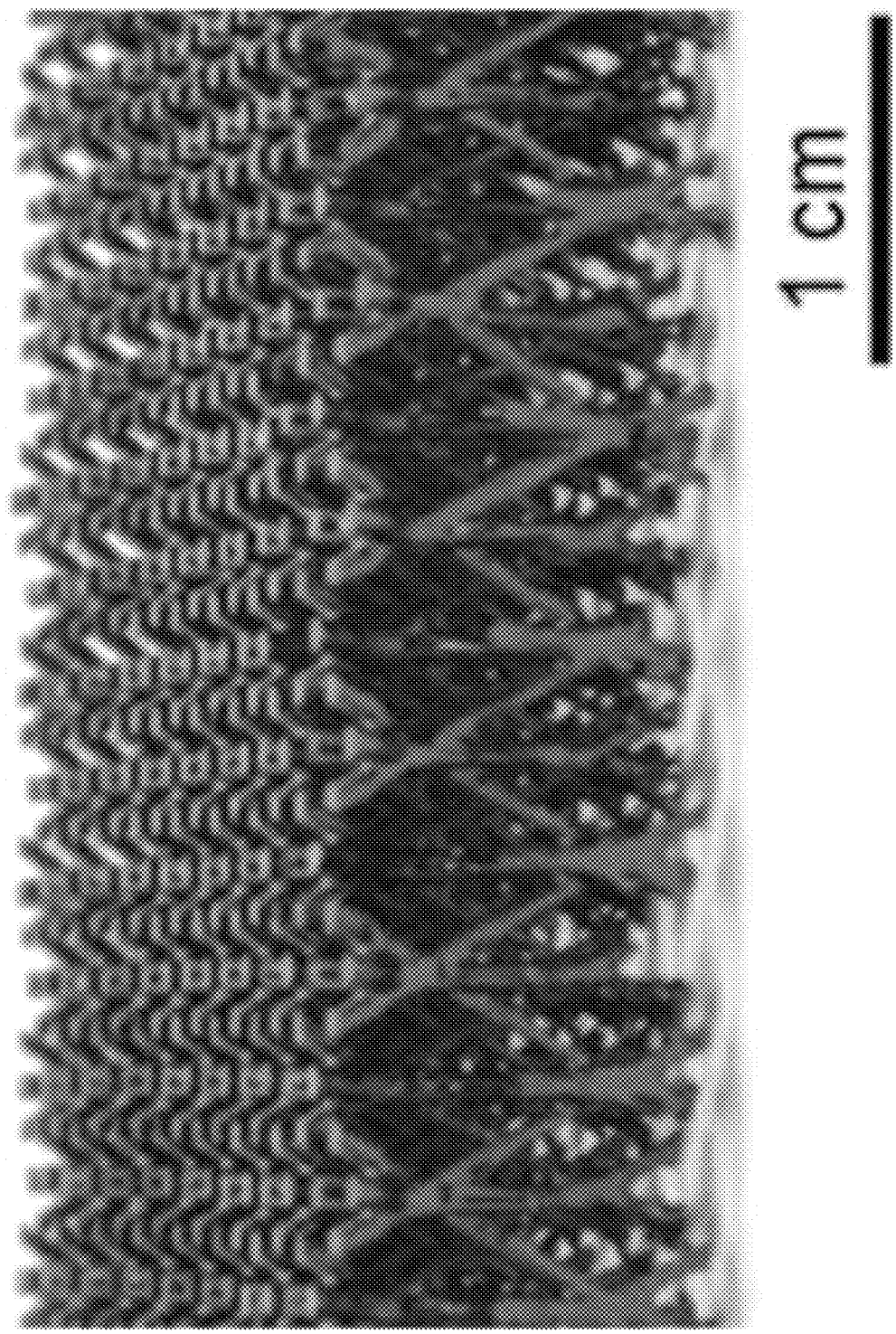
FIGS. 7-10 are photographs of ordered cellular materials according to embodiments of the present disclosure.
Figure 8:
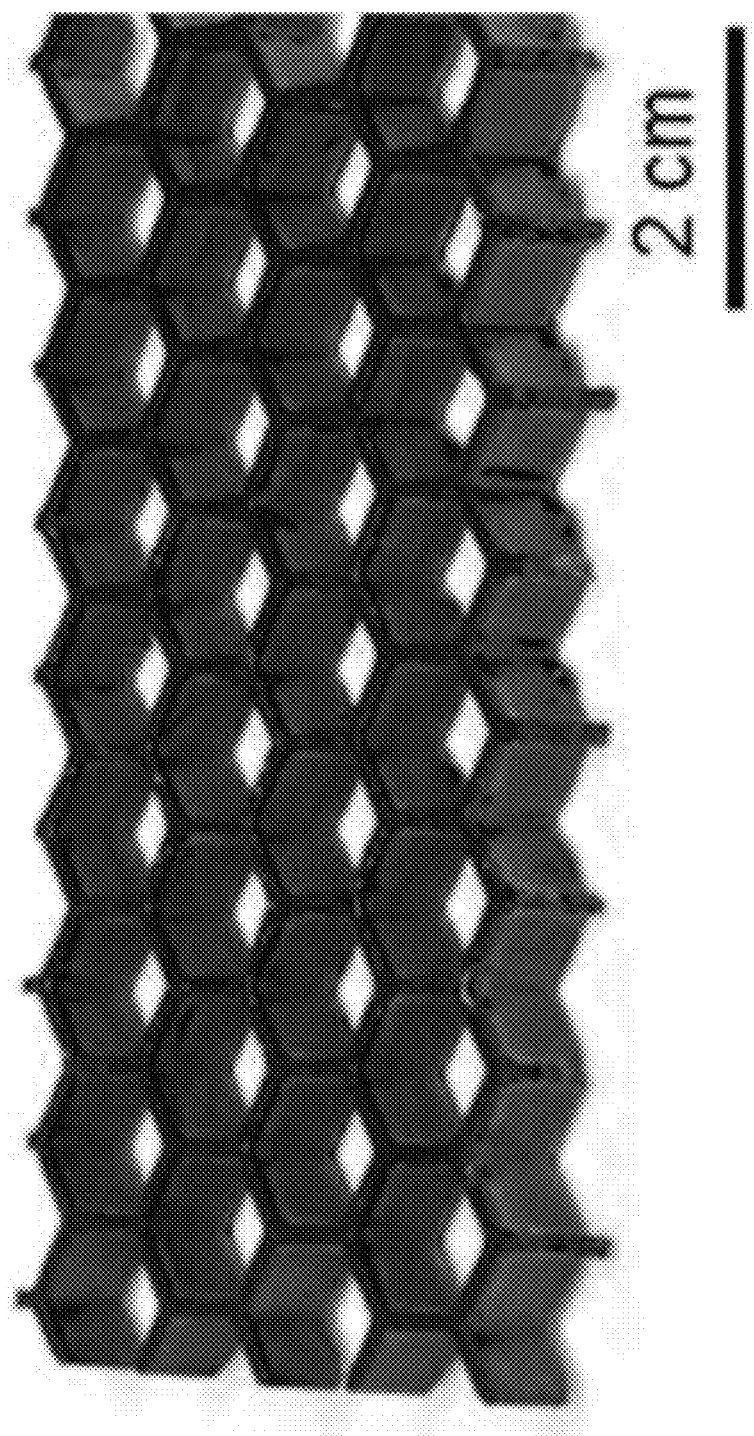
Figure 9:
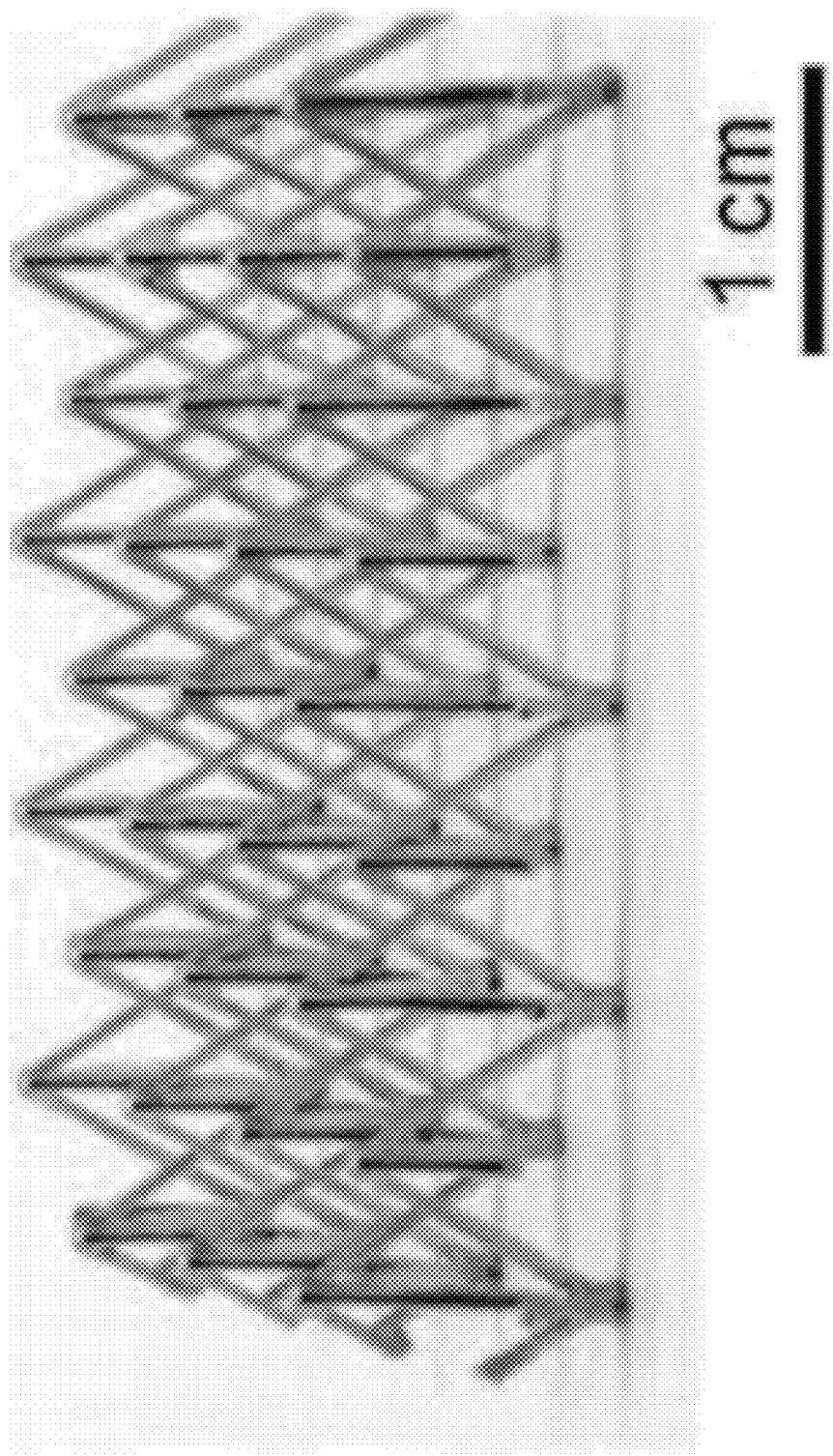
Figure 10:

Each cured pre-ceramic polymer structure was then pyrolyzed in a quartz tube furnace under a flowing argon atmosphere. A heating profile including a ramp of 1° C./min to 1000° C., a 60 minute hold at 1000° C. followed by a cooling rate of 3° C./min to room temperature was utilized. Exhaust gas produced by the heat treatment was run through a bleach/sodium hydroxide scrubber to remove potentially harmful gaseous products formed during pyrolysis. After cool-down, fully ceramic structures were obtained. FIGS. 7-10 are photographs showing embodiments of the ceramic structures that were formed without any additional processing after the heat treating (e.g., pyrolysis). FIG. 7 is a photograph of an embodiment of a cellular ceramic material having a microlattice structure. FIG. 8 is a photograph of an embodiment of a cellular ceramic material having a honeycomb structure. FIG. 9 is a photograph of an embodiment of a cellular ceramic material having a pyramidal truss structure. FIG. 10 is a photograph of an embodiment of a cellular ceramic material having a complex shaped core having graded architecture for an airfoil trailing edge.

Figure 11:
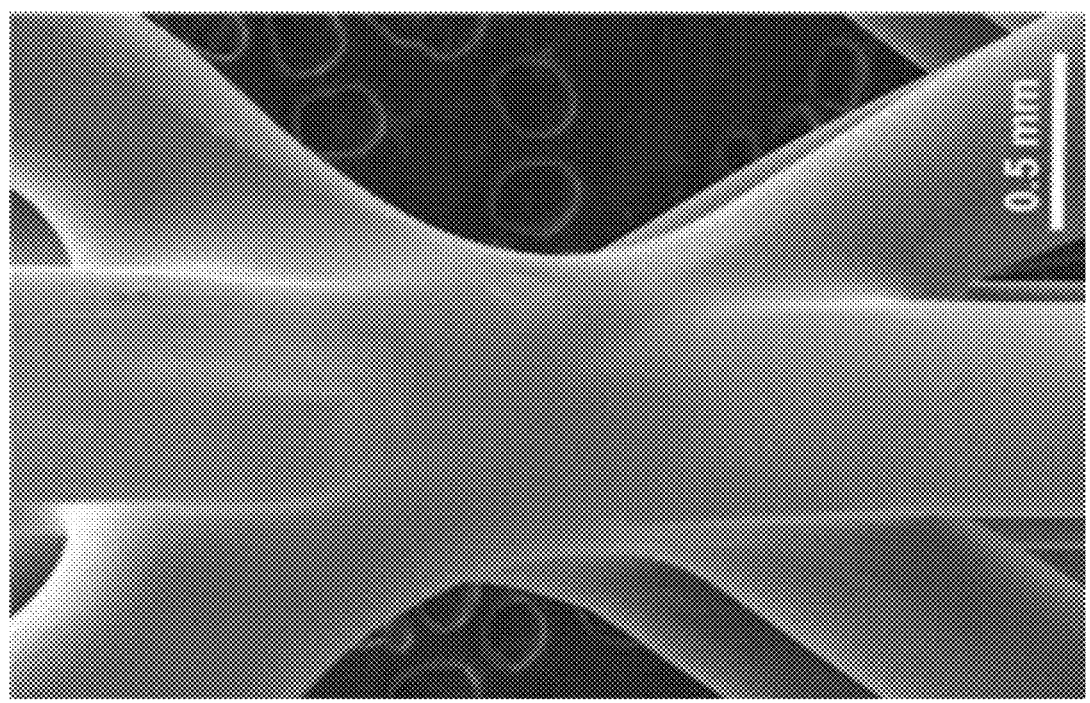
FIG. 11 is an scanning electron microscopy (SEM) image of a node of an ordered cellular material according to an embodiment of the disclosure.
Figure 12:
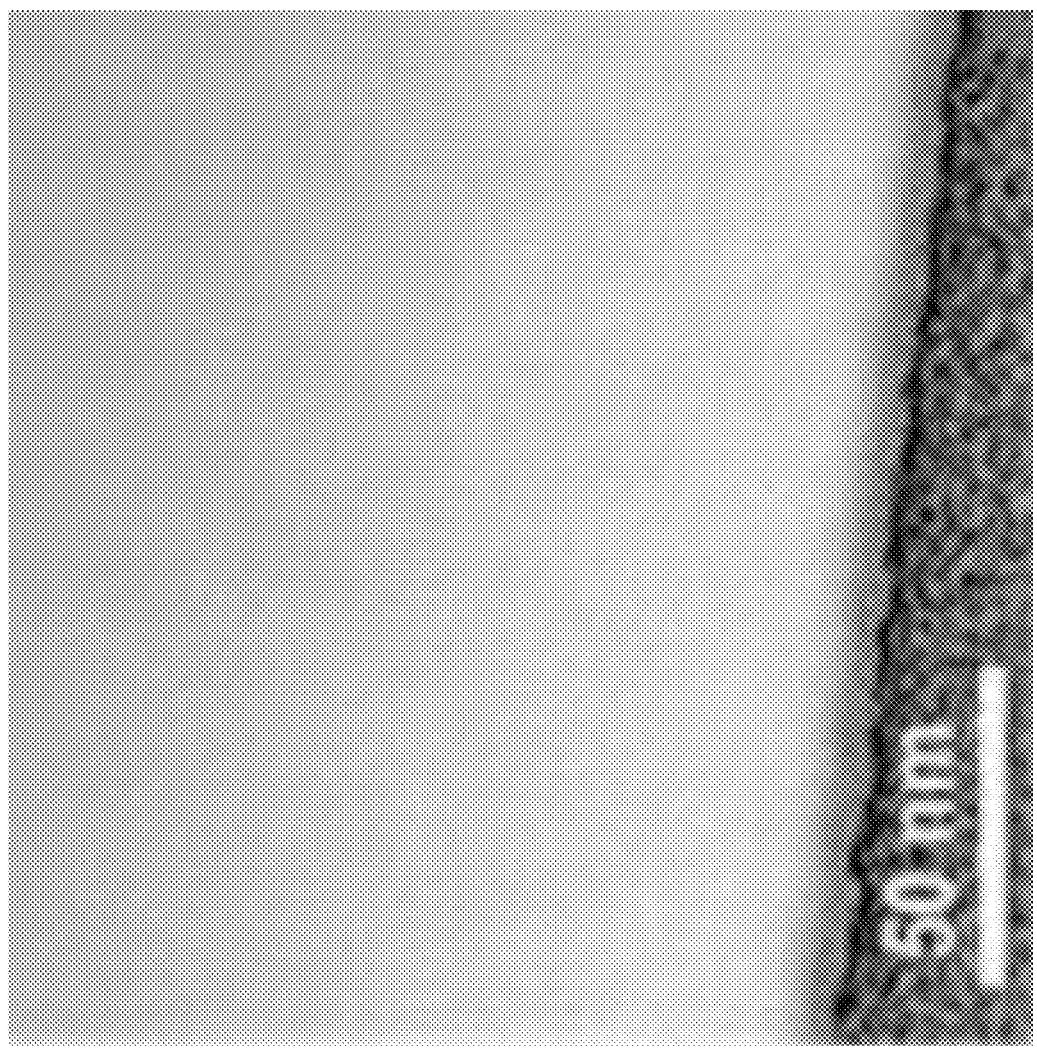
FIG. 12 is a bright-field SEM image of an ordered cellular material according to an embodiment of the disclosure.
Figure 13:
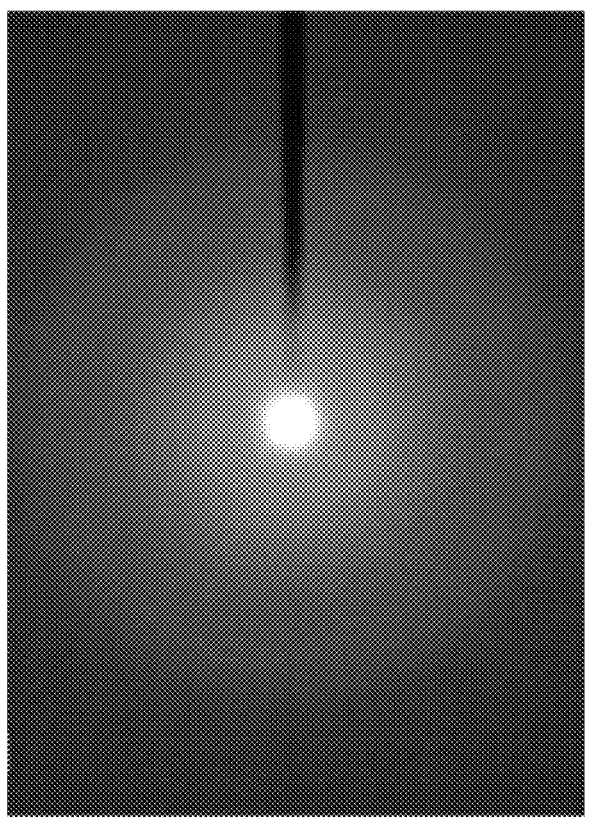
FIG. 13 is a TEM diffraction image of an ordered cellular material according to an embodiment of the disclosure.

Pyrolysis of embodiments of the polymer structures prepared as described herein at 1000° C. in Argon was accompanied by 42% weight loss and 30% shrinkage. The resultant ceramic is amorphous as determined by X-ray diffraction (XRD) and transmission electron microscopy (TEM) and has a composition of 26.7 at % silicon (Si), 33.4 at % carbon (C), 4.1 at % sulfur (S) and 35.8 at % oxygen (O) (e.g., a composition of $SiO_{1.34}C_{1.25}S_{0.15}$) as measured by inductively coupled plasma mass spectrometry. Ceramic lattices fabricated according to embodiments of the processes described herein exhibit fully dense struts and a very smooth surface with no or substantially no porosity or surface cracks as observed by scanning electron microscopy (SEM) and TEM. For example, FIG. 11 is an SEM image of a node of an embodiment of cellular ceramic material having a microlattice structure showing a smooth surface. FIG. 12 is a bright-field SEM image of an embodiment of a ceramic cellular material showing no or substantially no porosity. FIG. 13 is a TEM diffraction image of an embodiment of a ceramic cellular material indicating an amorphous structure (e.g., indicating that the ordered ceramic cellular is made of an amorphous material).

Figure 14A:
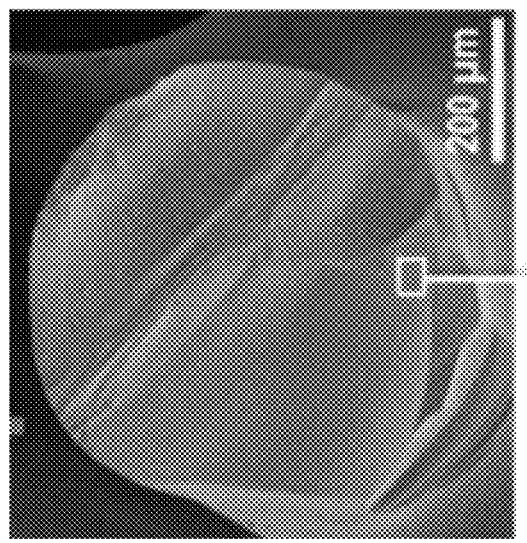
FIGS. 14A-14B are SEM images of a fractured strut of an ordered cellular material according to an embodiment of the present disclosure.
Figure 14B:
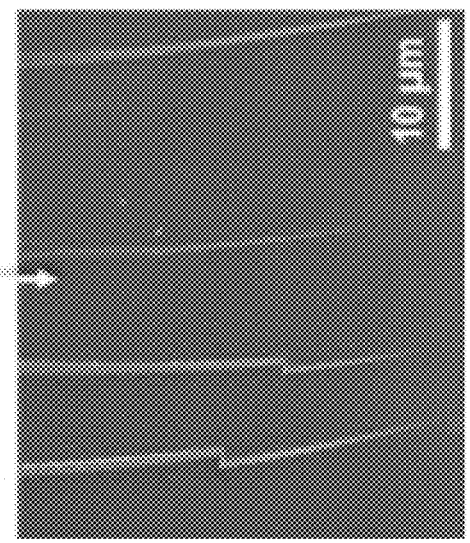

Embodiments of the struts fracture in a conchoidal manner typical for brittle amorphous materials, resulting in curved breakage surfaces and ripples. For example, FIG. 14A is an SEM image of a fractured strut of an embodiment of a cellular ceramic material, and FIG. 14B is a magnified SEM image of the area of FIG. 14A identified by the rectangle. FIG. 14B shows brittle fracture and no or substantially no porosity. To reduce or avoid shattering on pyrolysis, the starting polymer structure (e.g., pre-ceramic structure) may be prepared to have features less than ~3 mm in thickness in one dimension (e.g., all or substantially all of the features of the pre-ceramic structure may have features less than about 3 mm in thickness in each direction) and the heating rate may be less than 20° C./min, so that evolving gases can escape more easily.

By selecting suitable or appropriate cellular architectures, large ceramic structures can be fabricated, with the size only limited by the equipment used to fabricate the architectures. Embodiments of the fabrication process may introduce no or substantially no noticeable gradients in composition and temperature gradients are mitigated or reduced by the cellular architecture, thereby resulting in remarkably uniform or substantially uniform shrinkage during heat treating (e.g., pyrolysis). The shape of embodiments of the polymer structure may therefore be well-maintained and the shrinkage may be predicted, as long as any surfaces in contact with the structure during pyrolysis are lubricated to prevent or reduce sticking. FIGS. 7-10 provide a small window into the possible cellular materials and structures. All or substantially all of the demonstrated benefits of the self-propagating photopolymer waveguide technology for additive manufacturing of cellular materials and structures may now be extended to ceramics, including graded architecture, net-shape capabilities, and embedded features. Various suitable cellular architectures may be fabricated such as, for example, microlattices (FIG. 7), honeycombs (FIG. 8) and pyramidal truss structures (FIG. 9). For example, an embodiment of an airfoil trailing edge core has been fabricated to have a net-shape having graded core density, as shown in FIG. 10.

(Mechanical Testing)

Figure 15:
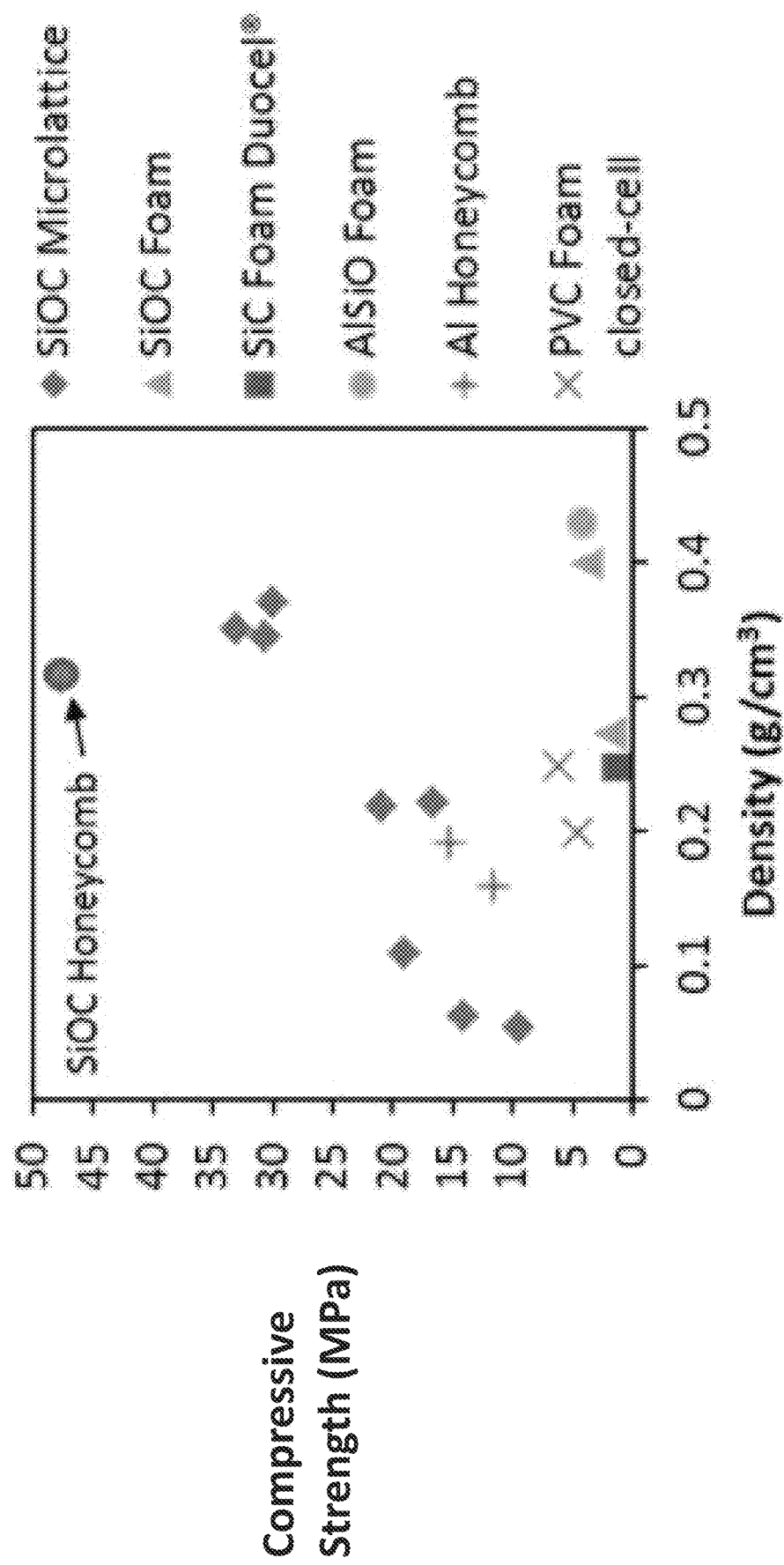
FIG. 15 is a graph showing compressive strength of ordered cellular materials according to embodiments of the present disclosure as compared to ceramic foams and other cellular materials.
Figure 16:
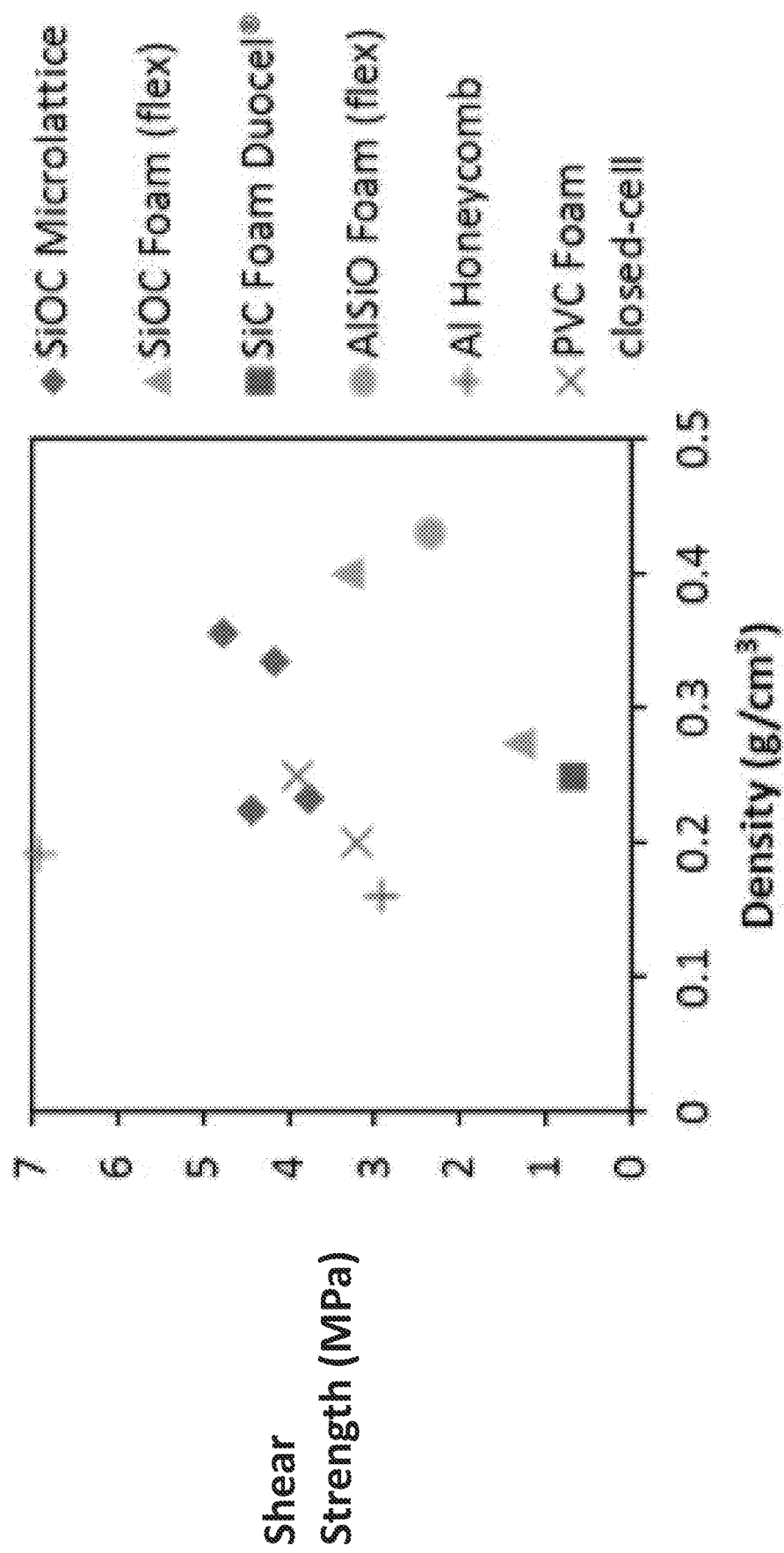
FIG. 16 is a graph showing shear strength of ordered cellular materials according to embodiments of the present disclosure as compared to ceramic foams and other cellular materials.

Compression and shear testing was performed on as-pyrolyzed silicon oxycarbide structures (e.g., polymer-derived SiOC materials, such as SiOC microlattice and SiOC honeycomb structures) according to embodiments of the disclosure and the results are summarized in FIGS. 15-16 with comparison to ceramic foams and other cellular materials. For example, FIG. 15 shows that embodiments of a SiOC microlattice having various densities and an embodiment of a SiOC exhibit substantially higher compressive strength than a SiOC foam, an SiC foam (Duocel®, Duocel® is a trademark of FDA FARMACEUTICI S.p.A.), an AlSiO foam, an Al honeycomb, and a polyvinylchloride (PVC) closed-cell foam. FIG. 16 shows that embodiments of a SiOC microlattice having various densities and an embodiment of a SiOC exhibit substantially higher compressive strength than a SiOC foam, an SiC foam (Duocel®, Duocel® is a trademark of FDA FARMACEUTICI S.p.A.), an AlSiO foam, an Al honeycomb, and a polyvinylchloride (PVC) closed-cell foam. The compression testing utilizing a prescribed displacement rate of 10 µm/s resulted in a specific strength of 188+/−23 MPa/g/cm³ (1 standard deviation) for pyramidal truss cores having densities of 0.06 to 0.11 g/cm³, 87+/−8 MPa/g/cm³ for microlattices having densities of 0.22 to 0.35 g/cm³, and 165+/−28 MPa/g/cm³ for honeycombs having densities of 0.3 to 0.8 g·cm³. Shear testing was performed on 4 samples according to ASTM C273 using a single lap shear test fixture and resulted in ultimate shear strengths in the range of 3.7 to 4.9 MPa and modulus values of 830 to 1570 MPa for microlattices having densities of 0.22 to 0.35 g/cm³. Failure in compression was catastrophic by sudden brittle fracture, while failure in shear was gradual by successive brittle fracture of single struts. Compared to ceramic foams of similar density, the mechanical properties of silicon oxycarbide microlattice structures according to embodiments of the present disclosure are outstanding, as can be seen in FIGS. 15-16. Embodiments of the ceramic materials exhibited 10 times higher compressive strength as compared to commercially available SiC foams (Duocel®, Duocel® is a trademark of FDA FARMACEUTICI S.p.A.) and aluminosilicate foam (ceramic insulation) as well as silicon oxycarbide foams of similar composition. The improvement in shear strength does not appear as large in FIG. 16, because the values reported for SiC and aluminosilicate foams are flexural strength, which is measured by a bending test and is generally higher. Even in comparison to other cellular sandwich core materials, such as aluminum alloy honeycomb (HexWeb®, HexWeb® is a registered trademark of Hexcel) and closed-cell polymer foam (Divinycell®, Divinycell® is a registered trademark of DIAB International AB), embodiments of the present polymer-derived ceramic cellular materials exhibit favorable properties. The measurement results and sample details are described further below and summarized in Table 1.

Compression tests were performed on a servo-electric INSTRON 5960 frame equipped with 500 N, 5 kN and 50 kN load cells (available from INSTRON, Norwood Mass.). The displacement rate was accurately controlled at 0.5 mm/min for these tests. Samples were bonded to steel facesheets utilizing epoxy adhesive to lock horizontal motion and to offset sample unevenness. Since a considerable amount of epoxy was in the load path, it was difficult to obtain accurate modulus measurements in compression. Shear tests were conducted according to ASTM C273, Standard Test Method for Shear Properties of Sandwich Core Materials, with slight deviations in test specimen geometry. Shear plates made of ¼" steel were bonded to the test samples with film adhesive TenCate BF548. Custom fittings were used to mount the shear plates to the load cells and grips. Displacement measurement was performed utilizing a custom fixture including a linear variable differential transformer (LVDT) (LD400-5, available from Omega, Stamford, Conn.) ensuring that only the displacement along the length of the sample is measured. The results of the mechanical testing are shown in Table 1 below.

TABLE 1

| | | Mechanical Test Samples | | | | | | | |
|---|---|---|---|---|---|---|---|---|---|
| Sample | Architecture | Cell Length L (mm) before pyrolysis | Cell Length L (mm) after pyrolysis | Diameter D (µm) after pyrolysis | Strut angle θ (°) | Density (g/cm³) | Relative Density (%) | Compressive Strength (MPa) | Shear Strength (MPa) | Shear Stiffness (MPa) |
| A | Microlattice | 7.2 | 5.1 | 0.5 | 60 | 0.22 | 10.7 | 21 | | |
| B | Microlattice | 7.2 | 5.1 | 0.6 | 60 | 0.37 | 18.1 | 30 | | |
| C | Microlattice | 7.2 | 5.1 | 0.6 | 60 | 0.35 | 16.9 | 30.7 | | |
| D | Microlattice | 7.2 | 5.1 | 0.6 | 60 | 0.35 | 17.1 | 35 | | |
| E | Microlattice | 7.2 | 5.1 | 0.5 | 60 | 0.22 | 10.9 | 16.6 | | |

TABLE 1-continued

Mechanical Test Samples

| Sample | Architecture | Cell Length L (mm) before pyrolysis | Cell Length L (mm) after pyrolysis | Diameter D (μm) after pyrolysis | Strut angle θ (°) | Density (g/cm³) | Relative Density (%) | Compressive Strength (MPa) | Shear Strength (MPa) | Shear Stiffness (MPa) |
|---|---|---|---|---|---|---|---|---|---|---|
| F | Pyramidal | 14 | 9.8 | 0.5 | 60 | 0.06 | 3.1 | 14.1 | | |
| G | Pyramidal | 14 | 9.8 | 0.5 | 60 | 0.06 | 2.7 | 9.4 | | |
| H | Pyramidal | 14 | 9.8 | 0.7 | 60 | 0.11 | 5.4 | 18.9 | | |
| I | Honeycomb | 10 | 7.1 | 1.4 | 60 | 0.32 | 15.4 | 47.6 | | |
| J | Honeycomb | 5 | 3.6 | 1.0 | 60 | 0.70 | 34.0 | 98.1 | | |
| K | Honeycomb | 5 | 3.6 | 1.1 | 60 | 0.80 | 39.0 | 163.3 | | |
| L | Microlattice | 7.2 | 5.1 | 0.5 | 60 | 0.22 | 11.0 | | 4.4 | 1205 |
| M | Microlattice | 7.2 | 5.1 | 0.5 | 60 | 0.23 | 11.4 | | 3.7 | 831 |
| N | Microlattice | 7.2 | 5.1 | 0.6 | 60 | 0.33 | 16.3 | | 4.2 | 1576 |
| O | Microlattice | 7.2 | 5.1 | 0.6 | 60 | 0.36 | 17.3 | | 4.8 | 939 |

The mechanical properties of a cellular material depend on the mechanical properties of the solid constituent material, the relative density of the cellular material, and the cellular architecture (e.g., the spatial configuration of voids and solids in the material). While the present application is not limited by any particular mechanism or theory, two factors are believed to contribute to the high strength exhibited by embodiments of the ceramic material. First, embodiments of the ordered, periodic architectures are inherently more mechanically efficient than a random foam architecture. For example, the general relationships for the elastic modulus (E) and failure strength (σ) of a cellular material may be described as:

$$E \approx C_1(E_s)(\rho/\rho_s)^{n1} \quad (1)$$

$$\sigma \approx C_2(\sigma_s)(\rho/\rho_s)^{n2} \quad (2)$$

In equations 1 and 2, the terms $E_s$ and $\sigma_s$ are the elastic modulus and representative failure strength of the solid material, respectively. The term $\rho/\rho_s$ is the relative density of the cellular material, which is defined as its density (ρ) divided by the density of the solid constituent material ($\rho_s$). The proportionality constants $C_1$ and $C_2$ are related to the geometric configuration of the cellular material with respect to the loading direction. The exponents n1 and n2 are 2 and 1.5 respectively for foams, where the cell struts exhibit bending-dominated deformation during elastic loading. Conversely a lattice material can exhibit stretching-dominated deformation, when the lattice members are configured so that they are loaded either in tension or compression, which results in much improved mechanical properties that decrease linearly with density (n1=1 and n2=1). Embodiments of the ceramic microlattices exhibit a scaling n2=1.06 and embodiments of the ceramic honeycombs show n2=1.18, demonstrating stretching-dominated mechanical performance. The difference in compressive strength arising from the different scaling of stretch-dominated versus bending-dominated architecture should be a factor of 3.2 at a relative density of 10% and increases to 5.8 at 3%. The proportionality constant for a brittle foam is approximately 0.2, whereas the constant is estimated to be ⅓ for microlattices (14), 0.87 for pyramidal truss structures and 1 for honeycombs, accounting for additional increases in strength.

Equation 2 as shown above can be used to calculate the strength of the solid constitutive material from the properties of the cellular materials and the pycnometrically determined density of the solid, for example, 2.05 g/cm³. Utilizing the proportionality constants mentioned above, an average fracture strength of 450 MPa is obtained for embodiments of silicon oxycarbide, which is on par with the strongest technical ceramics after elaborate processing, usually involving hot isostatic pressing.

The high intrinsic strength of embodiments of the present disclosure is the second factor, in addition to the architecture, contributing to the much higher strength of embodiments of the ceramic cellular materials as compared to ceramic foams. While the present disclosure is not limited by any particular mechanism or theory, the high intrinsic strength of embodiments of the polymer-derived silicon oxycarbide is believed to be due to a low distribution of flaws in the material, as ascertained by the absence of porosity and cracks in electron microscopy. The fracture strength of brittle materials may be calculated as follows:

$$\sigma_{fracture} = \sqrt{\frac{E\gamma\rho}{4ad_0}} \quad (3)$$

In equation 3, γ is the surface energy and $d_0$ is the equilibrium distance between atomic centers, which, together with E, determine the theoretical strength, while cracks with half-length a and crack tip radius r introduce stress concentrations that reduce the fracture strength. Since the flaw population in the polymer-derived ceramic material may be controlled well through the high purity of the starting resin and the unique process enabling porosity-free or substantially porosity-free material and smooth surfaces, higher fracture strength values with a tighter distribution are measured as compared to other ceramic materials, especially when derived from powder routes. Ultimate strength values are reported, but due to the brittle nature of the material, they also coincide with the yield and fracture strength.

To calculate the modulus of the solid constitutive SiOC material, equation 4 for shear modulus of microlattices may be used, because accurate modulus measurements could only be performed in shear testing. An average Young's modulus of 102+/−26 GPa was obtained for embodiments of the cellular ceramic materials.

$$G = \frac{E}{8}\sin^2(2\theta)\frac{\rho}{\rho_3} \quad (4)$$

Stiffness and strength of silicon oxycarbide foams have been reported to be virtually unchanged at temperatures up to 1200° C. Embodiments of the present disclosure provide remarkable mechanical properties achieved utilizing a fast, cost-efficient, additive manufacturing process and without additional post-processing, thereby providing many opportunities for application of embodiments of the cellular ceramic materials disclosed herein.

(High Temperature Stability)

While the present disclosure is not limited by any particular mechanism or theory, it is believed that the high temperature stability of silicon oxycarbides can be described as follows. The silicon oxycarbide family of polymer-derived ceramics has demonstrated excellent high temperature properties, including remarkable resistance to crystallization, oxidation and creep. These unique properties are enabled by silicon oxycarbide's unique nano- and microstructure; it is amorphous and exhibits nanodomains of silica tetrahedra that are encased in a network of graphene. The heart of the 1 to 3 nm domains is formed by silicon-oxygen tetrahedra and the interdomain boundaries consist of layers of $sp^2$ carbons. Silicon atoms bonded to one or two carbons substituted for oxygen make up the interface between silica domains and graphene walls. While the present disclosure is not limited by any particular mechanism or theory, it is believed that this nano-structure explains why the density, coefficient of thermal expansion, hardness, elastic modulus, index of refraction, glass transition temperature and viscosity of the silicon oxycarbide glasses are all higher than those in vitreous silica.

Embodiments of the silicon oxycarbide microlattice structures showed excellent stability at high temperatures in air. At 1300° C. the structures gained approximately 0.15% mass over 10 hours, and most of this mass gain occurred within the first two hours. While the present disclosure is not limited by any particular mechanism or theory, it is believed that this increase in mass is associated with a replacement reaction at the SiOC surface creating an amorphous $SiO_2$ oxide layer and releasing CO or $CO_2$. This oxide growth was qualitatively observed as a shift in interference coloration at the microlattice surface.

After each subsequent heat treatment there was a shift in iridescent coloration associated with increased thickness of the clear and thin (100 to 1000 nm) oxide scale consistent with thin-film interference coloration. At 1400° C. the samples showed a slow but steady mass decline of about 1% after 10 hours. This mass loss was attributed to the "burn off" of free carbon in the SiOC structure. The first two heat treatments showed no easily observable oxidation products. After the final heat treatment, however, a hazy surface oxide was observed. This oxidation product was observed by XRD to be cristobalite.

Figure 17:
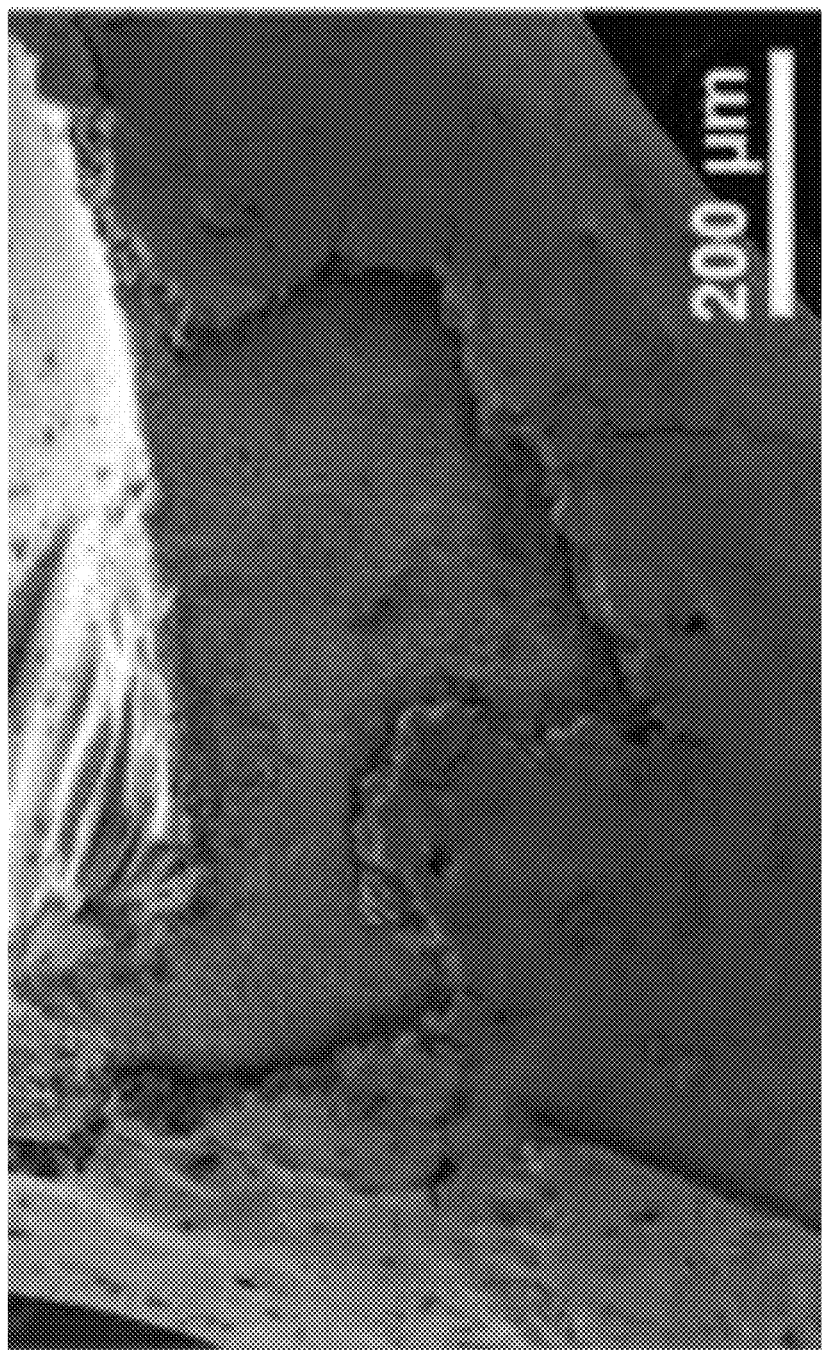
FIG. 17 is an SEM image of an ordered cellular material according to an embodiment of the disclosure after heat treating at 1500° C. for 10 hours.
Figure 18:
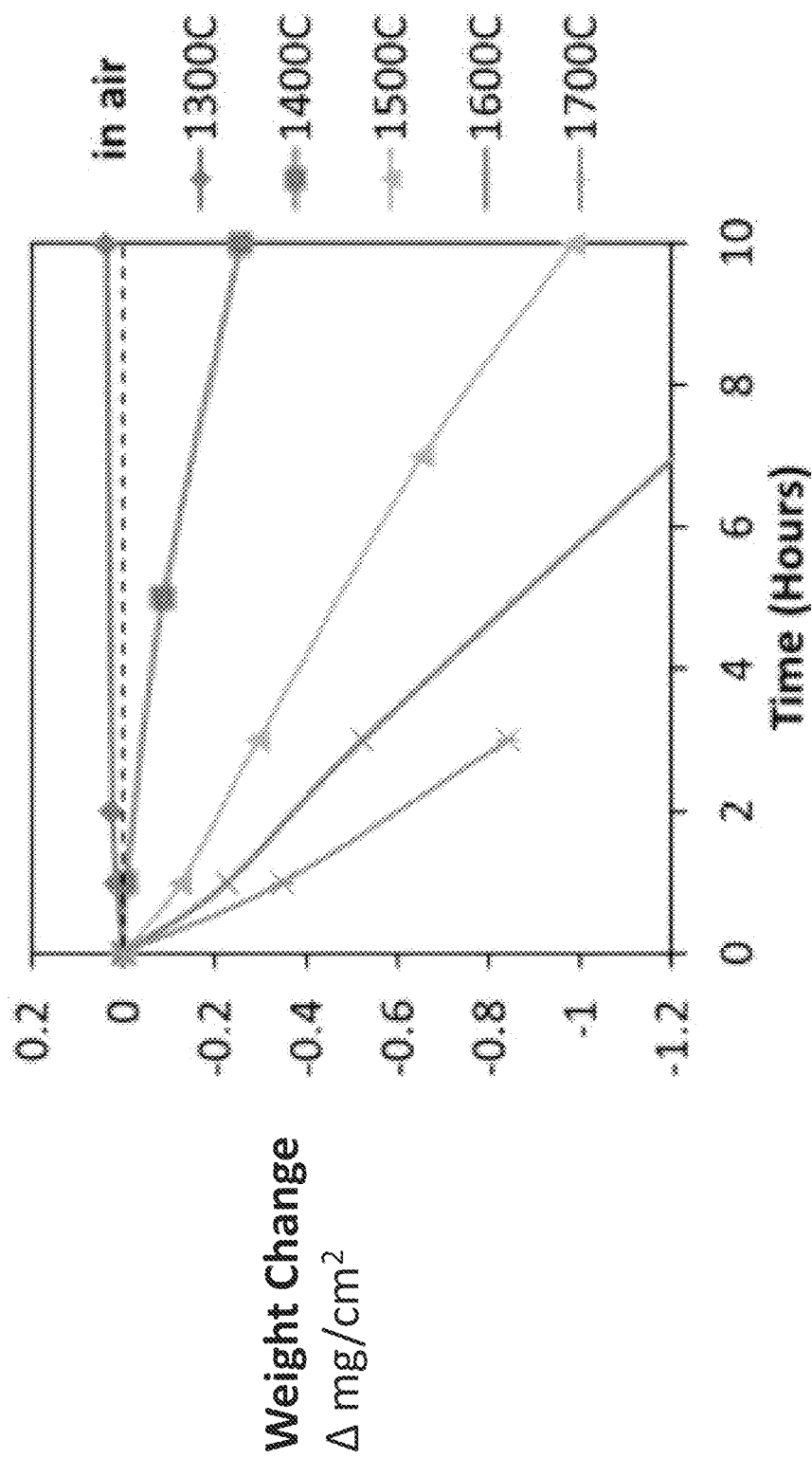
FIG. 18 is a graph showing weight change measured after consecutive heat treatment at various temperatures normalized by surface area for a silicon oxycarbide microlattice according to an embodiment of the present disclosure.

A similar behavior was observed at 1500° C., 1600° C., and 1700° C., albeit with an increasing mass loss rate and more pronounced cristobalite oxidation products, as can be seen in FIG. 17, which is an SEM image of an embodiment of a ceramic cellular material after heat treating at 1500° C. for 10 hours. FIG. 17 shows a fractured microlattice strut having spalled oxide scale after the heat treating. FIG. 18 is a graph showing the above-referenced weight change measured after consecutive heat treatment at various temperatures normalized by surface area for a silicon oxycarbide microlattice according to an embodiment of the present disclosure. The mass loss is normalized by the surface area, which is relatively high due to the cellular architecture of the samples, and is summarized in FIG. 18. The change in oxide structure is attributed to the oxidation product being amorphous at or below 1300° C., while at 1400° C. and higher temperatures it crystalizes to cristobalite. Below about 1400° C. the structure is very stable. At higher temperatures, however, $O_2$ diffusion into the bulk oxidizes available free carbon, and at even higher temperatures carbothermal reduction of $SiO_2$ from free carbon in the structure begins. The oxide shell on the surface appears to slow these reactions by limiting diffusion of the $O_2$ into the structure and $CO_X$ products out of the bulk.

Figure 19:
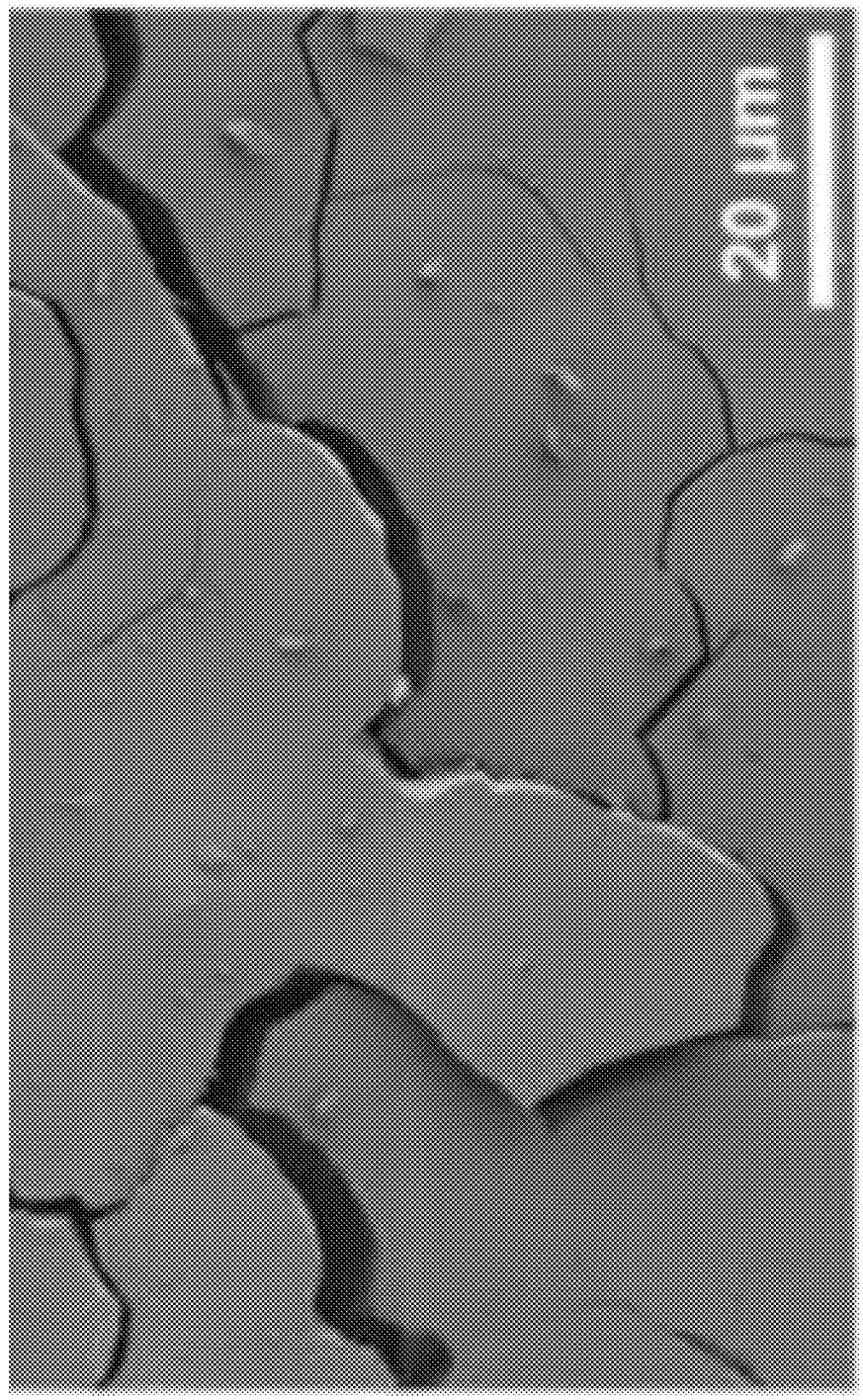
FIG. 19 is an SEM image of an ordered cellular material according to an embodiment of the present disclosure after cool-down from 1500° C.
Figure 20:
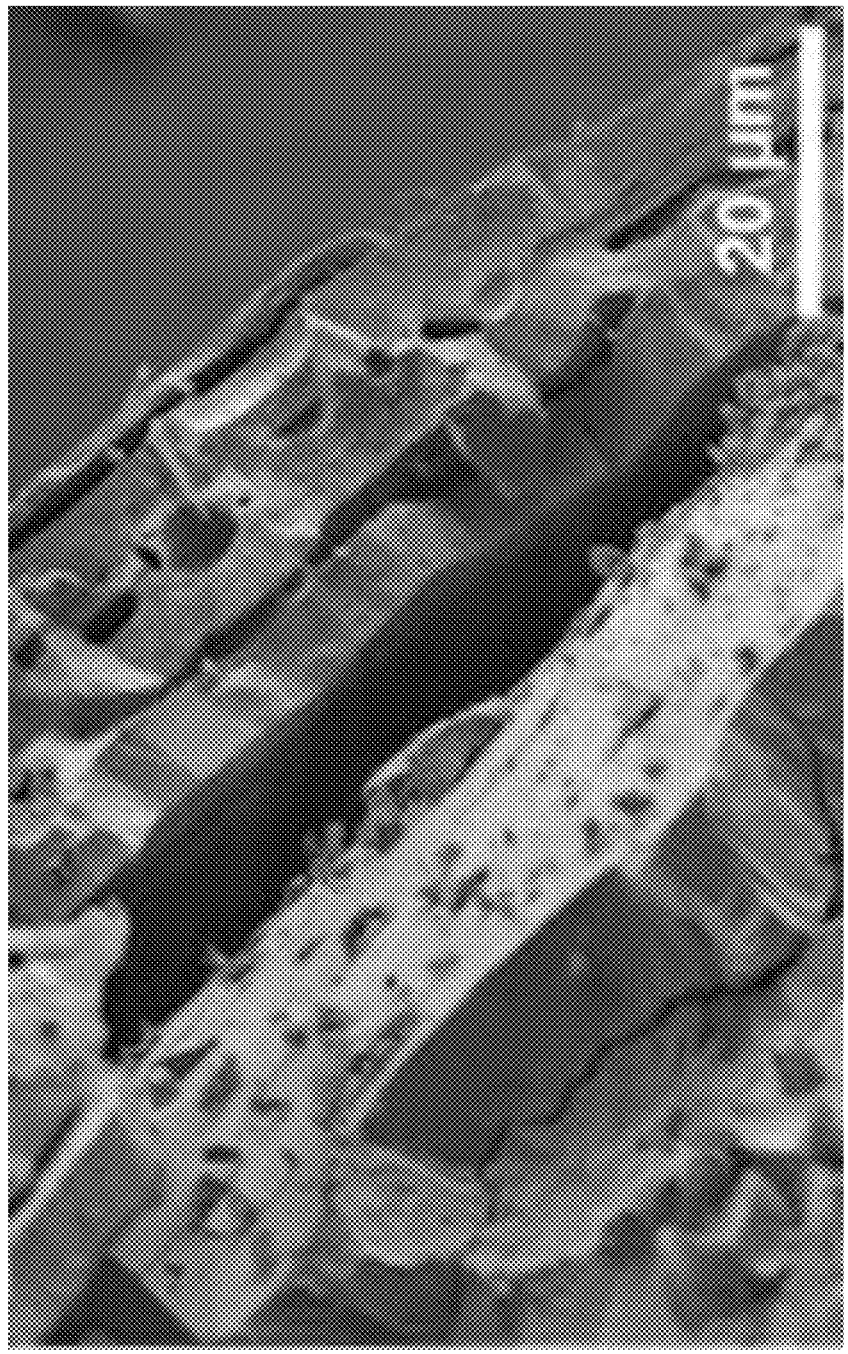
FIG. 20 is an SEM image of an ordered cellular material according to an embodiment of the present disclosure after four heating and cooling cycles.

Upon cooling there is a phase change with 7% volume change in the cristobalite as well as a large shift in the coefficient of thermal expansion (CTE), which leads to a cracked surface oxide, as can be seen in FIG. 19, which is an SEM image of an embodiment of a cellular ceramic material after cool-down. FIG. 19 shows cracks in the oxide scale after cool-down from 1500° C. Upon reheating the oxidation appears to restart underneath the cracked oxide layer, leading to a multilayer oxide scale after several heat treatments, as shown in FIG. 20, which is an SEM image of an embodiment of a cellular ceramic material after four heating and cooling cycles including heating to 1500° C. FIG. 20 shows four oxide layers associated with the four heating and cooling cycles. X-ray diffraction did not detect other phases beyond cristobalite, indicating that bulk crystallization products, specifically β-SiC, were not present or below the detection limit due to their small size and volume fraction.

Figure 21:
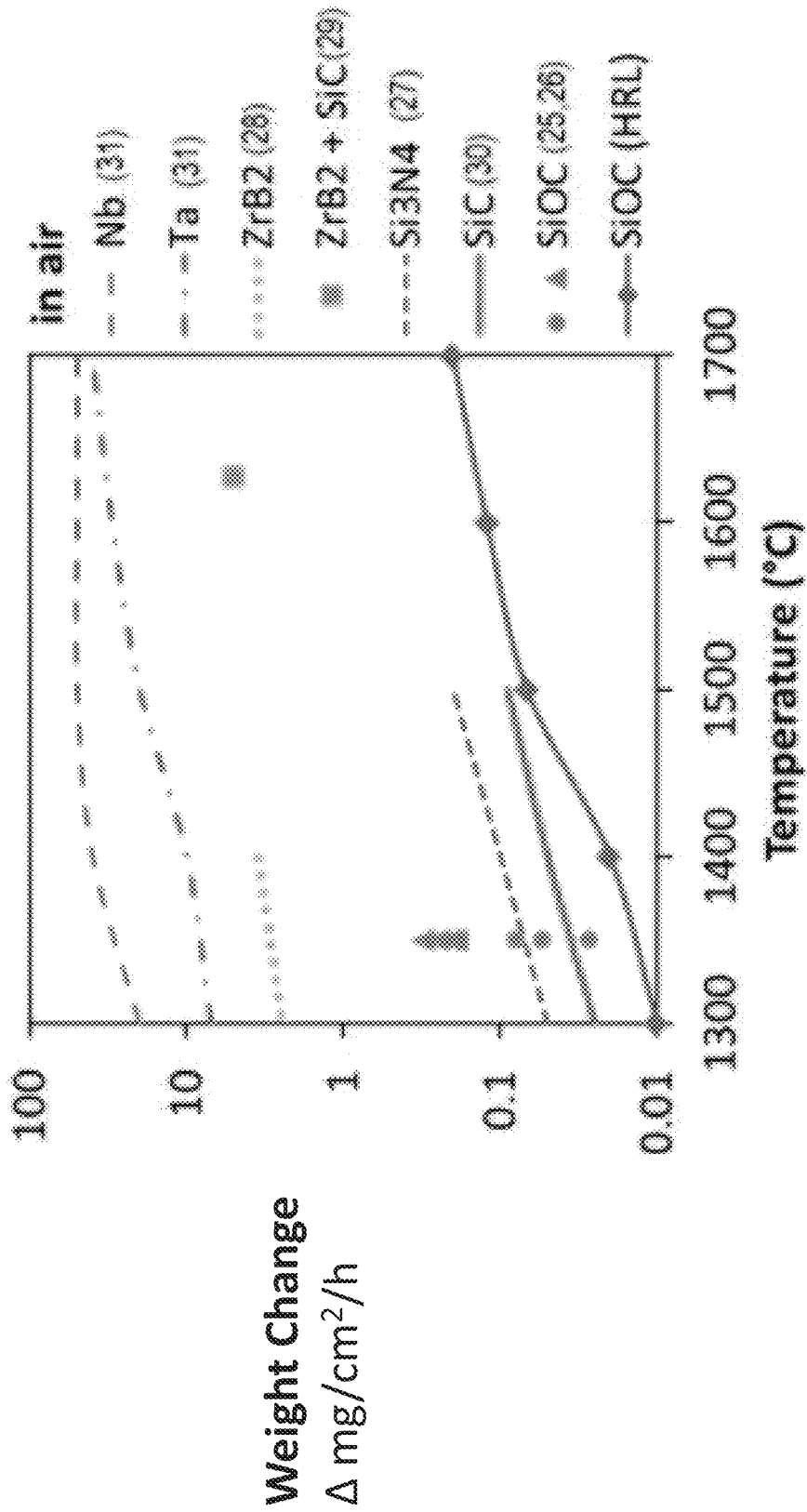
FIG. 21 is a graph showing weight change of a silicon oxycarbide microlattice according to an embodiment of the present disclosure as compared to other materials at various temperatures.

Transmission electron microscopy of a sample annealed at 1500° C. for 10 hours revealed the onset of bulk crystallization with scattered β-SiC crystals <10 nm inside the amorphous matrix. This indicates that the amorphous $SiO_{1.34}C_{1.25}S_{0.15}$ is more stable than other silicon oxycarbide compositions, which crystallize sooner (e.g., at lower temperature). The high temperature stability with respect to weight change in air is compared to other materials as shown in FIG. 21, in which weight change was extrapolated from reported weight vs. time curves after 1 hour exposure in air. FIG. 21 is a graph showing weight change of a silicon oxycarbide microlattice according to an embodiment of the present disclosure as compared to other materials at various temperatures. Embodiments of the silicon-oxycarbide structures disclosed herein show better oxidation performance than certain other silicon oxycarbide materials, which used different starting precursors, compositions and pyrolysis temperatures. Silicon oxycarbide is more resistant to oxidation than SiC and $Si_3N_4$ and has been investigated as oxidation protection coating for these materials. Embodiments of silicon oxycarbide have high dimensional stability at high temperature (e.g., 1700° C.), where no or substantially no deformation of a curved structure under its own weight was observed, despite being held at such a high temperature for three hours. After cool-down the truss structure was rigid and resisted fracture similarly to as-pyrolyzed structures.

11 samples were fabricated and pyrolyzed as described above and as further shown below. The samples were selected to study the silicon oxycarbide microlattice stability at elevated temperatures. The thermal history of the samples is shown Table 2, with the thermal history proceeding from left to right. Prior to measuring the mass change of the samples at different temperatures, samples 1-10 were annealed at 1300° C. in argon (Ar) to take pyrolysis to completion or substantially to completion and to stabilize or substantially stabilize the internal structure of the samples. The temperature 1300° C. was chosen because it is believed to be a threshold temperature before SiC crystallization in SiOC glasses. Mass change during the annealing step was approximately 0.3% by weight. Oxidation in air was then studied by heating the samples in an open ended tube furnace having porous ceramic thermal blocks at the edges of the hot zone to maintain even or substantially even heating, while still allowing fresh laboratory air into the hot zone. Heating rates were 5° C./min followed by a suitable hold. At the end of the hold, the furnace was shut off and the samples were allowed to air cool (generally cooling for a few hours to reach room temperature). After each heating cycle the samples were weighed and photographed (the end of each cycle is indicated as a data point in FIGS. 18 and 21). The samples were divided into batches for each temperature cycle. The data is presented as an average of the batches. Subsequent heat treatments at higher temperatures were performed on some of the samples as shown in Table 2 and as described below.

Samples 1-10 were fired together in one batch, while sample 11 was fired separately due to the increased size of the sample. Initial pyrolysis was completed in a tube furnace under flowing argon as described above. Samples 1 and 2 were subjected to an additional 10 hours of heating at 1300° C. in Argon to confirm that the material had substantially stabilized, which was confirmed by a subsequent mass change of only 0.05% by weight after 10 hours. Samples 3-10 were also subjected to 10 hrs of heating at 1300° C. in air (average data presented). Samples 3-10 showed little to no change (0.15% mass change by weight), and were assumed to be stable with no or substantially no effect after additional heat treatments. Sample 11 was not annealed at 1300° C. in argon to confirm that this stabilization step was unnecessary and the microlattice could be used at elevated temperatures directly after pyrolysis at 1000° C.

The weight yield of the microlattice samples after 1 hour exposure in air was 99.98 wt % at 1400° C., 99.05 wt % at 1600° C., and 98.79 wt % at 1700° C. which compares favorably with the weight yields of other silicon oxycarbide materials (e.g., 93.76% at 1400° C., 91.26% at 1600° C. and 65.46% at 1700° C.). A wide range of oxidation rates has been observed for other silicon oxycarbide materials and the weight loss depends strongly on the amount of free carbon in the silicon oxycarbide.

TABLE 2

| | Pre-Treatment | | Heat Treatments | | | | | | |
|---|---|---|---|---|---|---|---|---|---|
| Sample | Pyrolysis 1000° C. 1 hr in Argon | Anneal 1300° C. 1 hr Argon | 1300° C. 10 hr Argon | 1300° C. 10 hr Air | Anneal 1400° C. 1 hr Air | 1400° C. 9 hr Air (10 hr total) | 1500° C. 10 hr Air | 1600° C. 7 hr Air | 1700° C. 3 hr Air |
| 1 | X | X | X | | | | | X | |
| 2 | X | X | X | | | | | X | |
| 3 | X | X | | X | | | | | |
| 4 | X | X | | X | X | X | | | |
| 5 | X | X | | X | | | | | |
| 6 | X | X | | X | | | | | |
| 7 | X | X | | X | | | | | |
| 8 | X | X | | X | X | X | | | |
| 9 | X | X | | X | X | | X | | |
| 10 | X | X | | X | X | | X | | |
| 11 | X | | | | | | | | X |

(Transmission Electron Microscopy Characterization)

Figure 22:
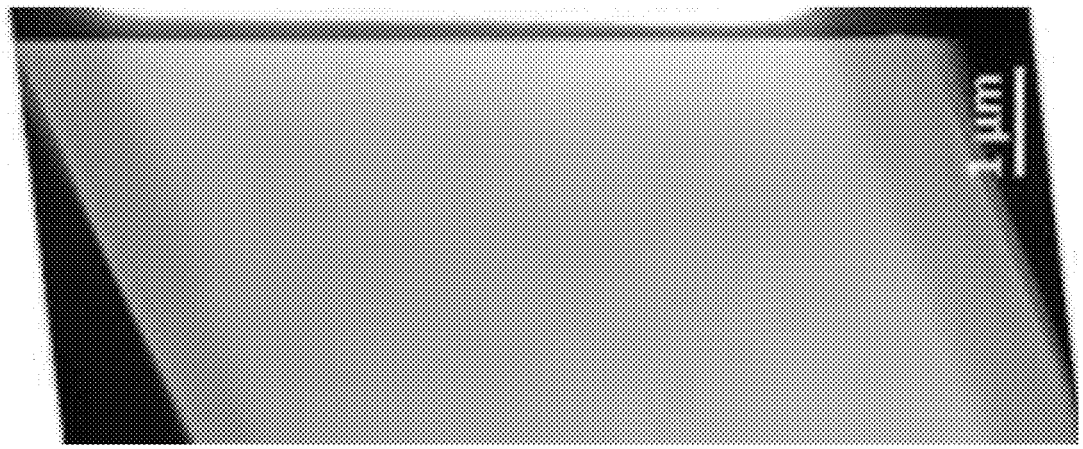
FIG. 22 is an SEM image of a lamella milled out of an embodiment of an as-pyrolyzed silicon oxycarbide microlattice.
Figure 23:
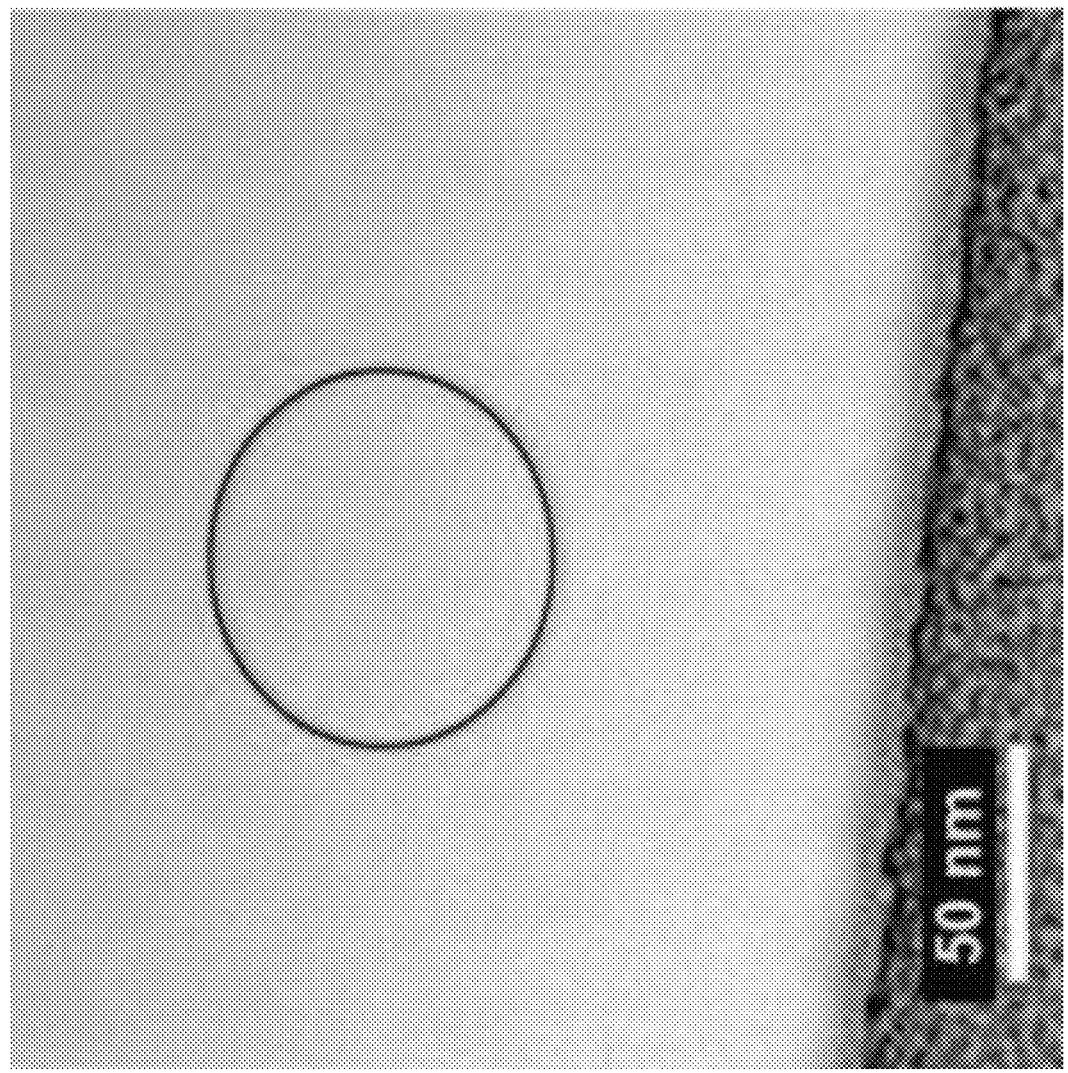
FIG. 23 is a bright-field TEM image of the lamella of FIG. 22.
Figure 24:
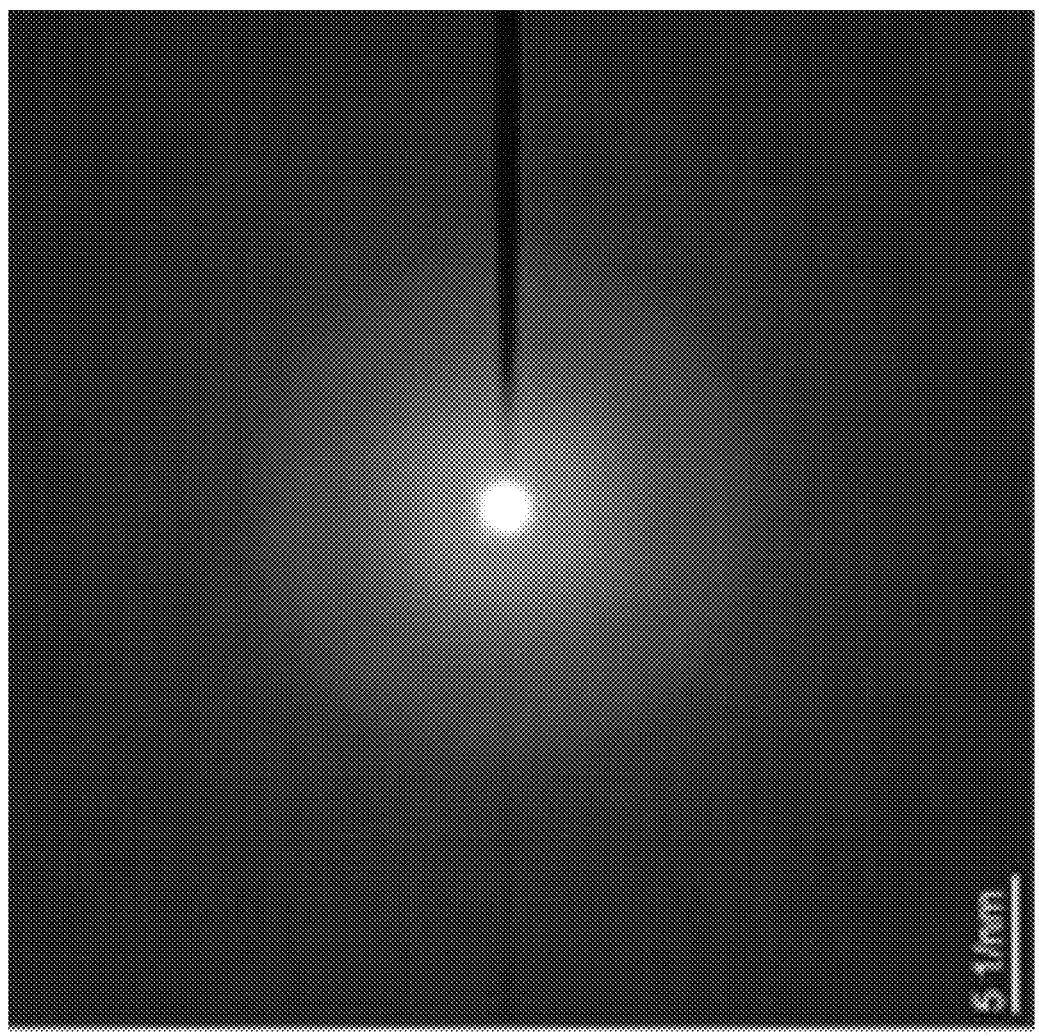
FIG. 24 is an X-ray diffraction pattern obtained from the circled area of the embodiment of the as-pyrolyzed silicon oxycarbide microlattice of FIG. 23.
Figure 25:
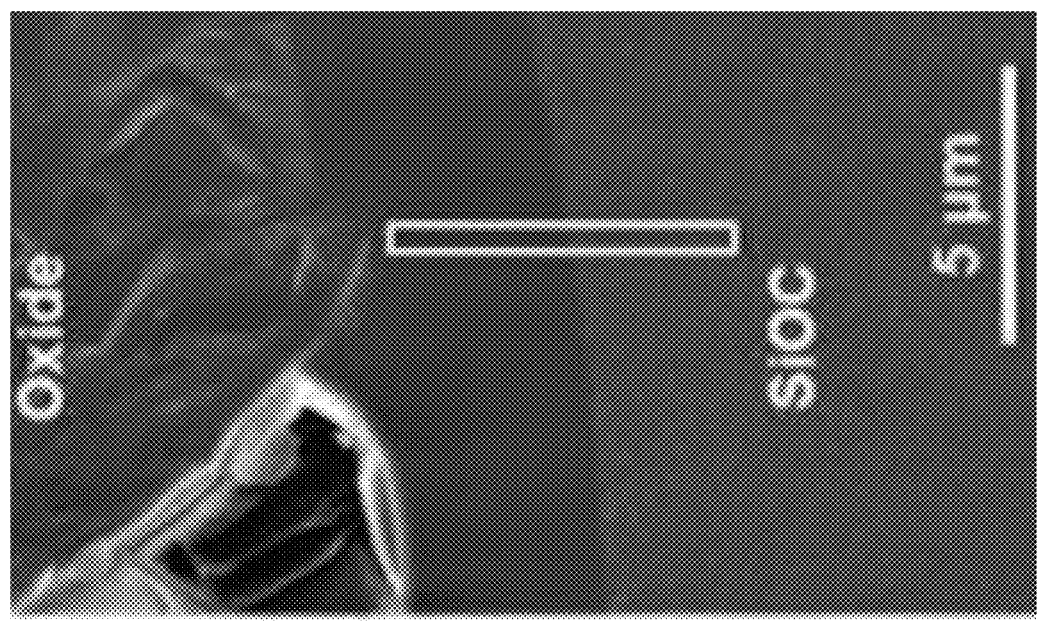
FIGS. 25-28 are TEM and bright-field TEM images showing characterization of an embodiment of a silicon oxycarbide microlattice after heat treatment for 10 hours at 1300° C. followed by heat treatment for 10 hours at 1500° C.
Figure 26:
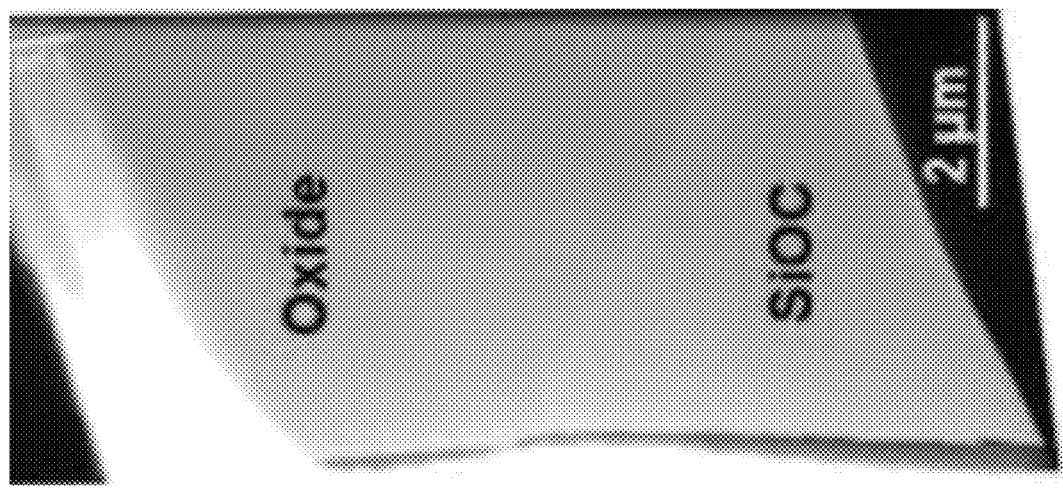

To characterize the silicon oxycarbide material in more detail, transmission electron microscopy (TEM) samples were extracted from microlattices using a focused ion beam system. FIG. 22 is an SEM image a lamella milled out of an embodiment of an as-pyrolyzed silicon oxycarbide microlattice. FIG. 23 is a bright-field TEM image of the lamella of FIG. 22 showing a homogeneous amorphous microstructure and no or substantially no porosity. FIG. 24 is an X-ray diffraction pattern taken from the area indicated by the circle in FIG. 23 confirming the amorphous nature of the as-pyrolyzed silicon oxycarbide after pyrolysis at 1000° C.

Figure 27:
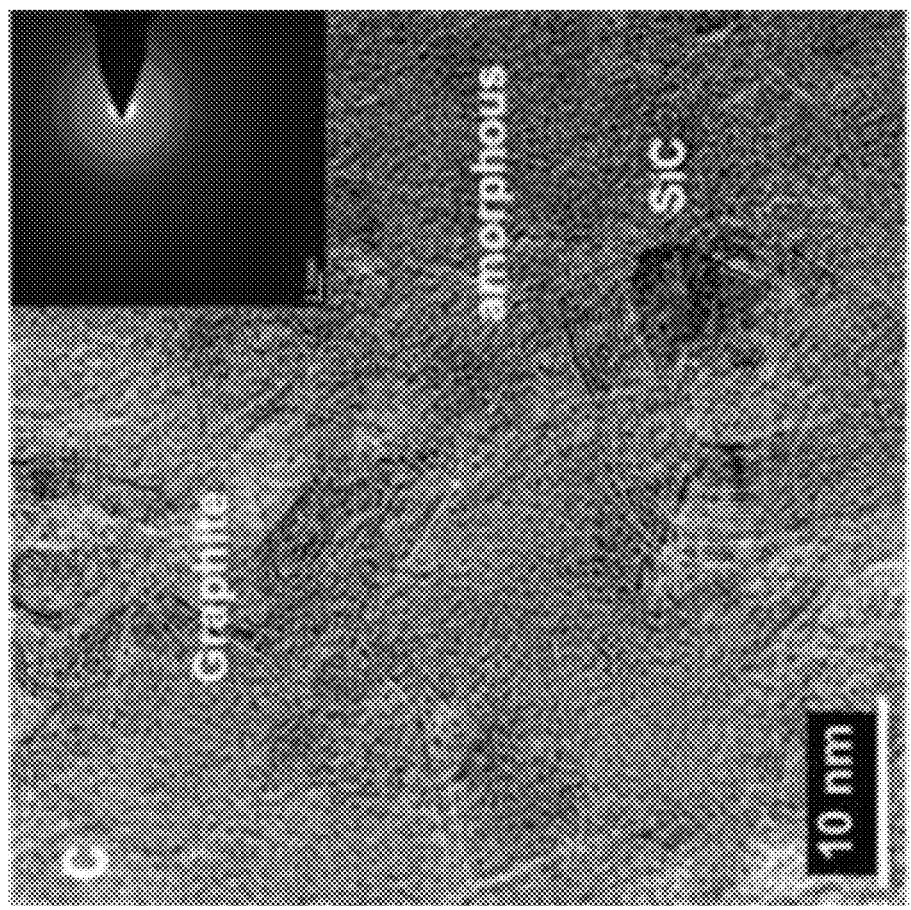
Figure 28:
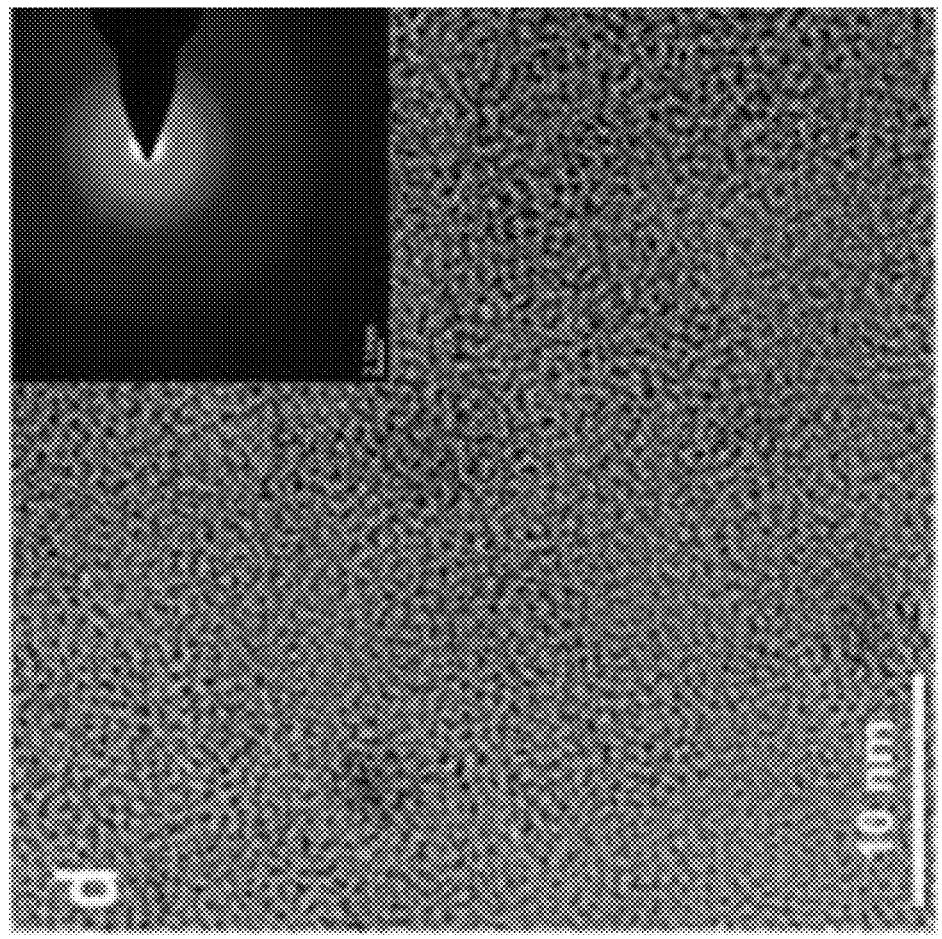

FIGS. 25-28 show characterization of an embodiment of a silicon oxycarbide microlattice after heat treatment for 10 hours at 1300° C. followed by heat treatment for 10 hours at 1500° C. A lamella was milled out of a fractured surface of a microlattice strut of the silicon oxycarbide microlattice as indicated by the rectangle in the TEM image of FIG. 25, so that oxide and SiOC base material could be analyzed as shown in the TEM image of FIG. 26. Bright-field TEM images as shown in FIGS. 27-28 showed small crystallites of a few nanometers in size in both the oxide and SiOC region. High resolution imaging could identify the crystallites as graphite and β-SiC based on the lattice spacing and diffraction pattern shown in the bright-field TEM image of FIG. 27. The small size of 5 to 10 μm of the crystals and the high fraction of remaining amorphous matrix indicate that crystallization had just started. The crystallites in the oxide region are even smaller as can be seen in the bright-field TEM image of FIG. 28, consistent with the recent formation of this oxide region. Larger crystals may also be present in older oxide layers further from the interface contributing to the cristobalite diffraction pattern recorded by X-ray diffraction (XRD), which is shown below. There were small pores in the SiOC region that were not observed before the heat treatments and which may have developed due to carbon leaving as CO or $CO_2$ gas. The composition of the oxide region measured by energy-dispersive X-ray spectroscopy (EDS) was 34 at % Si, 2 at % C, and 64 at % O. The composition of the SiOC region was 28 at % Si, 31 at % C, 40 at % 0, and 1 at % S, within the typical error margin of EDS, when compared to the composition of as-pyrolyzed material measured by inductively coupled plasma mass spectrometry: 26.7 at % Si, 33.4 at % C, 4.1 at % S and 35.8 at % O.

Powder X-ray diffraction conducted on a crushed silicon oxycarbide microlattice sample after the heat treatment of 1300° C./10h+1500° C./10h indicated cristobalite with some amorphous structure, but detected no or substantially no SiC crystallization, which is consistent with the small size and low volume fraction of the SiC crystals observed in TEM.

According to embodiments of the present disclosure, cellular ceramic materials and structures having set shapes and/or architectures may be prepared by processing polymer derived ceramics prepared utilizing the self-propagating photopolymer waveguide approach. Various suitable ceramic compositions can be processed utilizing embodiments of these approaches, including structures including porosity and defect free amorphous silicon oxycarbide. Embodiments of cellular SiOC materials exhibit 10 times higher strength than certain other ceramic foams of similar density, and can survive temperatures of 1700° C. in air. Embodiments of the cellular ceramic materials are of interest for lightweight, load-bearing ceramic sandwich panels for high temperature applications, such as, for example, those in hypersonic vehicles and jet engines. Composite and metallic sandwich designs are heavily utilized in lightweight applications throughout aerospace and other industries, but introduction of sandwich structures in high temperature applications has been limited by a lack of structurally robust high temperature core materials. Further, the flexible, scalable and cost-efficient process of embodiments of the disclosure will open opportunities for complex shaped, environmentally resistant ceramic structures from the micro scale such as, for example, in MEMS or biomedical devices, to the macro scale such as, for example, in thermal protection systems for hypersonic vehicles.

As used herein, the terms "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. As used herein, the terms "combination thereof" and "combinations thereof" may refer to a chemical combination (e.g., an alloy or chemical compound), a mixture, or a laminated structure of components.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the accompanying drawings. It will be understood that the spatially relative terms are intended to encompass different orientations of the device in use or in operation, in addition to the orientations depicted in the accompanying drawings. For example, if the structures in the accompanying drawings are turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

While the subject matter of the present disclosure has been described in connection with certain embodiments, it is to be understood that the subject matter of the present disclosure is not limited to the disclosed embodiments, but, on the contrary, the present disclosure is intended to cover various modifications and equivalent arrangements included within the spirit and scope of the appended claims, and equivalents thereof

What is claimed is:

1. A composition for forming an ordered ceramic material, the composition comprising:
   a first UV curable pre-ceramic monomer comprising two or more groups selected from the group consisting of C=X double bonds, C≡X triple bonds, and combinations thereof, X being selected from the group consisting of C, N, and O, the first UV curable pre-ceramic monomer comprising at least one non-carbon atom in a main chain and/or a side chain, and the non-carbon atom being selected from the group consisting of Si, B, Al, Ti, Zn, P, and Ge;

a second UV curable pre-ceramic monomer comprising two or more groups selected from the group consisting of thiol groups, hydroxyl groups, amine groups, and combinations thereof, the second UV curable pre-ceramic monomer further comprising at least one non-carbon atom in a main chain and/or a side chain, and the non-carbon atom being Si; and a photoinitiator.

2. The composition of claim 1, further comprising a free radical inhibitor, wherein the free radical inhibitor is selected from the group consisting of hydroquinone; methylhydroquinone; ethylhydroquinone; methoxyhydroquinone; ethoxyhydroquinone; monomethylether hydroquinone; propylhydroquinone; propoxyhydroquinone; tert-butylhydroquinone; n-butylhydroquinone, and mixtures thereof.

3. The composition of claim 1, wherein the first UV curable pre-ceramic monomer is present in the composition in an amount of 3% to 97% by weight based on the total weight of the composition.

4. The composition of claim 1, wherein the C=X double bonds or C≡X triple bonds are located at respective terminal positions of the first UV curable pre-ceramic monomer.

5. The composition of claim 1, wherein the second UV curable pre-ceramic monomer is present in the composition in an amount of greater than 0% to 97% by weight based on the total weight of the composition.

6. The composition of claim 1, wherein the second UV curable pre-ceramic monomer comprises an alkyl group, an ester group, an amine group, and/or a hydroxyl group.

7. The composition of claim 1, wherein the photoinitiator is present in the composition in an amount of greater than 0% to less than 10% by weight based on the total weight of the composition.

8. The composition of claim 1, wherein the photoinitiator generates free radicals by intramolecular bond cleavage and/or intermolecular hydrogen abstraction.

9. The composition of claim 8, wherein the photoinitiator is responsive to UV light with a wavelength of 200 nm to 500 nm.

10. The composition of claim 1, wherein the photoinitiator is selected from the group consisting of 2,2-dimethoxy-2-phenylacetophenone; 2-hydroxy-2-methylpropiophenone; camphorquinone; bis(2,4,6-trimethylbenzoyl)-phenylphosphineoxide; benzophenone; benzoyl peroxide; and mixtures thereof.

11. The composition of claim 1, wherein the first UV curable pre-ceramic monomer comprises at least one additional non-carbon atom selected from the group consisting of O and N.

12. The composition of claim 11, wherein X is selected from the group consisting of N and O.

13. The composition of claim 1, wherein X is selected from the group consisting of N and O.

14. The composition of claim 1, wherein the second UV curable pre-ceramic monomer comprises at least one additional non-carbon atom selected from the group consisting of O and N.

15. The composition of claim 1, further comprising a free radical inhibitor in an amount sufficient to allow formation of pre-ceramic waveguides and to reduce polymerization of the UV curable pre-ceramic monomers in regions outside of the pre-ceramic waveguides.

* * * * *